(12) United States Patent
Fujii et al.

(10) Patent No.: US 11,631,419 B2
(45) Date of Patent: *Apr. 18, 2023

(54) VOICE MONITORING SYSTEM AND VOICE MONITORING METHOD

(71) Applicant: PANASONIC INTELLECTUAL PROPERTY MANAGEMENT CO., LTD., Osaka (JP)

(72) Inventors: Ryota Fujii, Fukuoka (JP); Hiroyuki Matsumoto, Fukuoka (JP); Hiroaki Hayashi, Fukuoka (JP); Kazunori Hayashi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 259 days.

This patent is subject to a terminal disclaimer.

(21) Appl. No.: 17/175,220

(22) Filed: Feb. 12, 2021

(65) Prior Publication Data

US 2021/0166711 A1 Jun. 3, 2021

Related U.S. Application Data

(63) Continuation of application No. 16/320,338, filed as application No. PCT/JP2017/020900 on Jun. 6, 2017, now Pat. No. 10,930,295.

(30) Foreign Application Priority Data

Jul. 28, 2016 (JP) .............................. JP2016-148470

(51) Int. Cl.
*G10L 21/00* (2013.01)
*G10L 17/14* (2013.01)
(Continued)

(52) U.S. Cl.
CPC .............. *G10L 21/00* (2013.01); *G06Q 50/10* (2013.01); *G10L 17/14* (2013.01); *G10L 25/21* (2013.01);
(Continued)

(58) Field of Classification Search
None
See application file for complete search history.

(56) References Cited

U.S. PATENT DOCUMENTS 8,972,265 B1 * 3/2015 Lester ..................... G10L 13/00
704/258
9,706,168 B1 * 7/2017 Ludwig .................. G06V 20/52
(Continued)

FOREIGN PATENT DOCUMENTS

| JP | 2002-186084 | 6/2002 |
|---|---|---|
| JP | 2010-206419 | 9/2010 |
| JP | 2012-147420 | 8/2012 |

OTHER PUBLICATIONS

Official Communication issued in International Bureau of WIPO Patent Application No. PCT/JP2017/020900, dated Aug. 29, 2017.

*Primary Examiner* — Douglas Godbold
(74) *Attorney, Agent, or Firm* — Greenblum & Bernstein, P.L.C.

(57) ABSTRACT

A recording device records a video and an imaging time, and a voice. Based on the voice, a sound parameter calculator calculates a sound parameter for specifying magnitude of the voice in a monitoring area at the imaging time for each of pixels and for each of certain times. A sound parameter storage unit stores the sound parameter. A sound parameter display controller superimposes a voice heat map on a captured image of the monitoring area and displays the superimposed image on a monitor. At this time, the sound parameter display controller displays the voice heat map
(Continued)

based on a cumulative time value of magnitude of the voice, according to designation of a time range.

14 Claims, 27 Drawing Sheets

(51) Int. Cl.
- *G10L 25/21* (2013.01)
- *G10L 25/57* (2013.01)
- *G10L 25/60* (2013.01)
- *G10L 25/84* (2013.01)
- *H04N 7/18* (2006.01)
- *H04R 1/40* (2006.01)
- *H04R 3/00* (2006.01)
- *G06Q 50/10* (2012.01)

(52) U.S. Cl.
CPC .............. *G10L 25/57* (2013.01); *G10L 25/60* (2013.01); *G10L 25/84* (2013.01); *H04N 7/18* (2013.01); *H04N 7/183* (2013.01); *H04R 1/40* (2013.01); *H04R 1/406* (2013.01); *H04R 3/00* (2013.01); *H04R 3/005* (2013.01)

(56) References Cited

U.S. PATENT DOCUMENTS

| | | | | |
|---|---|---|---|---|
| 2006/0284978 | A1* | 12/2006 | Girgensohn | G06F 16/786 348/E7.086 |
| 2008/0255847 | A1* | 10/2008 | Moriwaki | G10L 21/06 704/270.1 |
| 2010/0220552 | A1* | 9/2010 | Owaki | G01S 3/8083 367/127 |
| 2012/0163610 | A1* | 6/2012 | Sakagami | H04S 7/30 381/56 |
| 2013/0226593 | A1* | 8/2013 | Magnusson | H04N 9/806 704/276 |
| 2014/0163982 | A1* | 6/2014 | Daborn | G10L 15/26 704/235 |
| 2015/0006176 | A1 | 1/2015 | Pogue | |
| 2015/0348538 | A1* | 12/2015 | Donaldson | G10L 15/26 704/235 |
| 2017/0019744 | A1* | 1/2017 | Matsumoto | G06V 10/147 |
| 2017/0280108 | A1* | 9/2017 | Matsumoto | H04N 7/183 |
| 2019/0088243 | A1* | 3/2019 | Prasad | G10K 11/1754 |

\* cited by examiner

FIG. 8

| BYTE POSITION | SIZE | CONTENT |
|---|---|---|
| 0 | 4 BYTE | FILE HEADER |
| 4 | 4 BYTE | FILE SIZE |
| 8 | 4 BYTE | RECORDING DATE AND TIME |
| 12 | 4 BYTE | RECORDING DURATION |
| 16 | 4 BYTE | "fmt"(fmt CHUNK) |
| 20 | 4 BYTE | FORMAT VERSION |
| 24 | 4 BYTE | "data"(data CHUNK) |

FIG. 13

| BYTE POSITION | SIZE | CONTENT |
|---|---|---|
| 0 | 4 BYTE | FILE HEADER |
| 4 | 4 BYTE | FILE SIZE |
| 8 | 4 BYTE | RECORDING DATE AND TIME |
| 12 | 4 BYTE | RECORDING DURATION |
| 16 | 4 BYTE | "fmt"(fmt CHUNK) |
| 20 | 4 BYTE | FORMAT VERSION |
| 24 | 4 BYTE | "data"(data CHUNK) |
| 28 | 4*210*210*60 BYTE | 60 SOUND PARAMETERS PER SECOND |
| ... | 4*210*210*60 BYTE | AVERAGE VALUE OF SOUND PARAMETERS FOR LAST 60 SECONDS |
| ... | 4*210*210*60 BYTE | 60 SOUND PARAMETERS PER SECOND |
| ... | ... | ... |

VOICE MONITORING SYSTEM AND VOICE MONITORING METHOD

CROSS REFERENCE TO RELATED APPLICATIONS

This is a continuation application of U.S. patent application Ser. No. 16/320,338, filed on Jan. 24, 2019, which is a National Stage Entry of International Patent Application No. PCT/JP2017/020900, filed on Jun. 6, 2017, and which claims the benefit of Japanese Patent Application No. 2016-148470, filed on Jul. 28, 2016. The disclosure of each of the above-identified applications, including the specification, drawings, and claims, is incorporated herein by reference in its entirety.

TECHNICAL FIELD

The present disclosure is related to a voice monitoring system and a voice monitoring method for analyzing a traffic line of a person in an area to be monitored.

BACKGROUND ART

As a technology for analyzing a traffic line of a person (for example, a clerk or a customer) in an area to be monitored (for example, in a store), a visualization technology of the traffic line using a person detection and a person tracking technology by image analysis is known. With the visualization technology, it is possible to analyze a moving location of the person. However, it is not possible to distinguish how much time a conversation between the clerk and the customer is performed in the store such as a restaurant, a convenience store, or the like in which a customer service is frequently performed or whether the customer simply stops, for example.

As the related art associated with the traffic line visualization technology described above, for example, an image processing device disclosed in PTL 1 is proposed. The image processing device detects a face of a conferee by processing an image captured by a camera, detects a direction of arrival of a voice by a plurality of microphones, changes a direction in which the voice is collected based on deviation time information, and calculates a level of the collected voice. In addition, the image processing device displays an image illustrating the voice level overhead a speaker of the conferee of a conference room image based on face detection information, voice arrival direction information, and voice level information.

However, if an instantaneous value of the voice level of the voice currently being spoken by the speaker is calculated and an image illustrating a calculation result (the instantaneous value of the voice level) is just displayed overhead the speaker of the conferee, it is not possible to perform speech analysis such as visualizing a result obtained by calculating the voice level of a voice spoken for a certain period in the past. Therefore, for example, in a case where the clerk in the store performed the customer service for a certain period in the past, it is not possible for a person (for example, an observer) who monitors an action or the like of the clerk in the store to visually recognize how much time and how much voice level the conversation of the clerk is continued.

The present disclosure is to analyze how much time and how much voice level a person performs a customer service for a customer or the like in an area to be monitored such as a store or the like for a designated past period, to visually view an analysis result, and to improve monitoring analysis accuracy.

CITATION LIST

Patent Literature

PTL 1: Japanese Patent Unexamined Publication No. 2012-147420

SUMMARY OF THE INVENTION

According to the present disclosure, a voice monitoring system includes: a camera that images an area to be monitored; a microphone array that collects a sound in the area; a recorder that stores a captured image captured by the camera and an imaging time, and the sound collected by the microphone array in association with each other; a sound parameter calculator that repeatedly calculates a sound parameter indicating magnitude of the sound in the area at the imaging time for each of predetermined units of pixels constituting the captured image based on the sound collected by the microphone array during imaging of the camera; a sound parameter storage unit that stores the sound parameter calculated by the sound parameter calculator in association with position information on the captured image at the imaging time; and a sound parameter display controller that superimposes a sound source visual image based on the sound parameter on each of predetermined units of the pixels constituting the captured image and displays the superimposed image on a monitor, in which the sound parameter display controller superimposes the sound source visual image based on a cumulative value within a time range of the sound parameter stored in the sound parameter storage unit on each of predetermined units of the pixels constituting the captured image and displays the superimposed image on the monitor, according to designation of the time range.

In addition, according to the present disclosure, an imaging system includes the image processing device, the plurality of cameras, and the display input device.

In addition, according to the present disclosure, there is provided a voice monitoring method in a voice monitoring system including a camera, a microphone array, a recorder, and a reproduction control device, the method including: imaging, by the camera, an area to be monitored; collecting, by the microphone array, a sound in the area; storing, by the recorder, a captured image captured by the camera and an imaging time, and the sound collected by the microphone array in association with each other; repeated calculating, by the reproduction control device, a sound parameter indicating magnitude of the sound in the area at the imaging time for each of predetermined units of pixels constituting the captured image based on the sound collected by the microphone array during imaging of the camera; storing, by the reproduction control device, the calculated sound parameter in association with position information on the captured image at the imaging time in the recorder; and superimposing, by the reproduction control device, a sound source visual image based on the sound parameter on each of predetermined units of the pixels constituting the captured image and monitoring the superimposed image, in which the reproduction control device superimposes the sound source visual image based on a cumulative value within a time range of the sound parameter stored in the recorder on each of predetermined units of the pixels constituting the captured image and displays the superimposed image on the monitor, according to designation of the time range.

According to the present disclosure, it is possible to analyze how much time and how much voice level a person performs a customer service for a customer or the like in an area to be monitored such as a store or the like for a designated past period, to visually view an analysis result, and to improve monitoring analysis accuracy.

BRIEF DESCRIPTION OF DRAWINGS

FIG. 8 is a diagram illustrating an example of a structure of a file storing the sound parameter according to the first exemplary embodiment.

FIG. 13 is a diagram illustrating an example of a structure of a file storing a sound parameter in units of 60 seconds according to the sixth exemplary embodiment.

FIG. 15 is a diagram illustrating an example of a GUI displayed on a monitor according to a ninth exemplary embodiment.

DESCRIPTION OF EMBODIMENTS

Hereinafter, each of embodiments which specifically disclose a voice monitoring system and a voice monitoring method according to the present disclosure will be described in detail with reference to the appropriate drawings. However, in some cases, an unnecessarily detailed explanation may be omitted. For example, in some cases, a detailed description of already well-known items and a repetition description of the substantially same configuration of the items may be omitted. This is for avoiding unnecessary repetition of the following description and for facilitating understanding by those skilled in the art. The accompanying drawings and the following description are provided to enable those skilled in the art to fully understand the present disclosure and are not intended to limit a scope of the claims.

First Exemplary Embodiment

Figure 1:
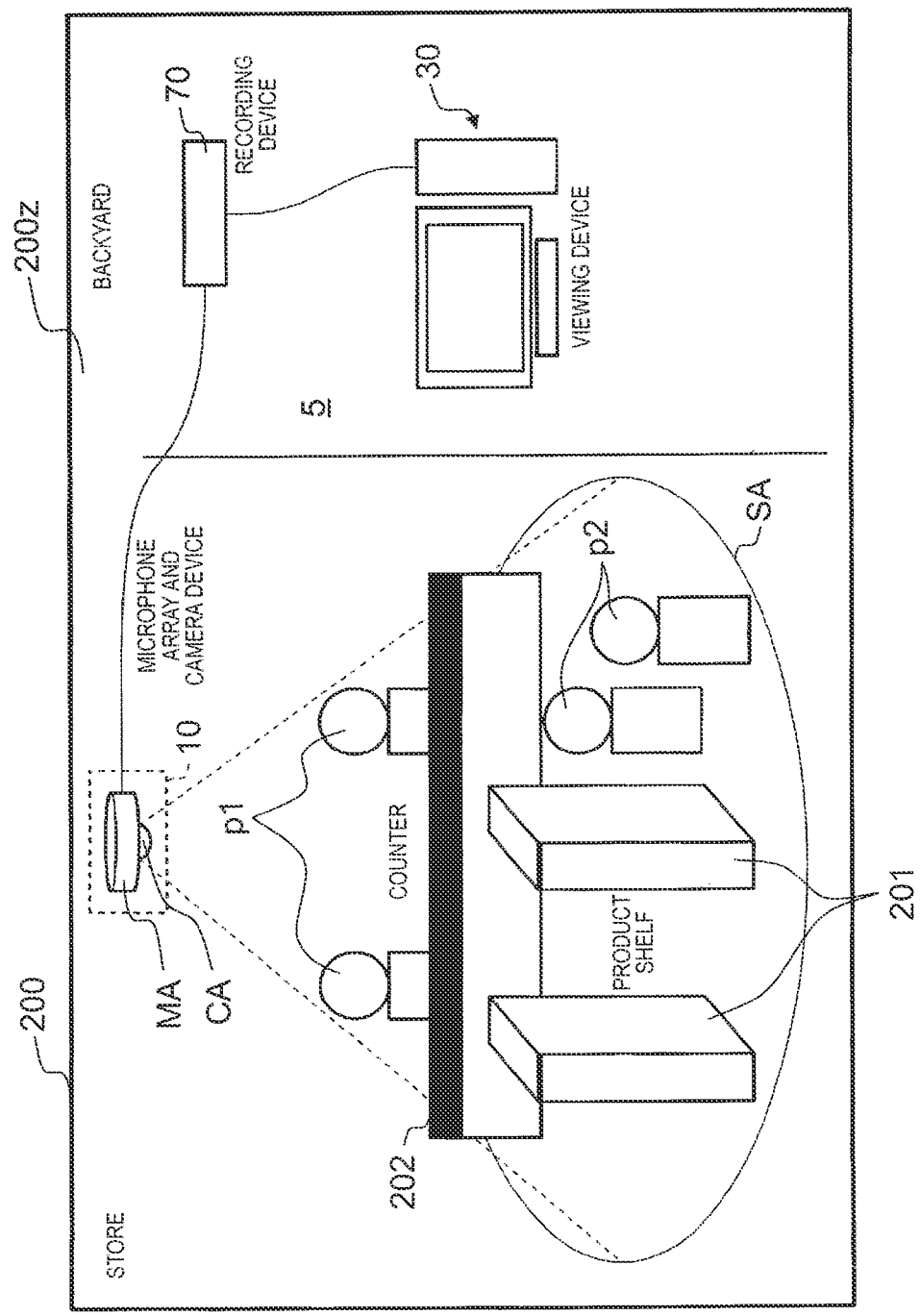
FIG. 1 is a diagram illustrating an example in which a voice monitoring system according to a first exemplary embodiment is installed in a store.

FIG. 1 is a diagram illustrating an example in which voice monitoring system 5 according to a first exemplary embodiment is installed in a store. For example, voice monitoring system 5 is installed in store 200 such as a restaurant, a convenience store, or the like and monitors a status of a customer service of a target (for example, a clerk) to be monitored by an observer such as a manager or the like. In the following description, it is assumed that voice monitoring system 5 is installed in a store, but an installation destination is not limited to the store, and voice monitoring system 5 may be installed in a public facility such as a factory or a library, or an office. In store 200, product shelf 201 on which many products are displayed, counter 202, and the like are installed. Counter 202 is used, for example, as a checkout counter for paying for a product purchased by a customer, for example, as a customer service. When paying for the product, clerk p1 and customer p2 usually face each other across counter 202 and make conversation with each other.

Voice monitoring system 5 is configured to include microphone array and camera device 10, viewing device 30, and recording device 70. Microphone array and camera device 10 is configured by integrating microphone array MA and omnidirectional camera CA in a coaxial direction and is fixedly attached above counter 202. For example, microphone array and camera device 10 is attached to a ceiling of store 200. Omnidirectional camera CA images monitoring area SA including counter 202. The monitoring area is an area of a status of a customer service performed by a clerk or the like to be monitored by voice monitoring system 5 and the same may be applied to the following description. Microphone array MA collects voices generated in an area covering monitoring area SA.

Figure 2:
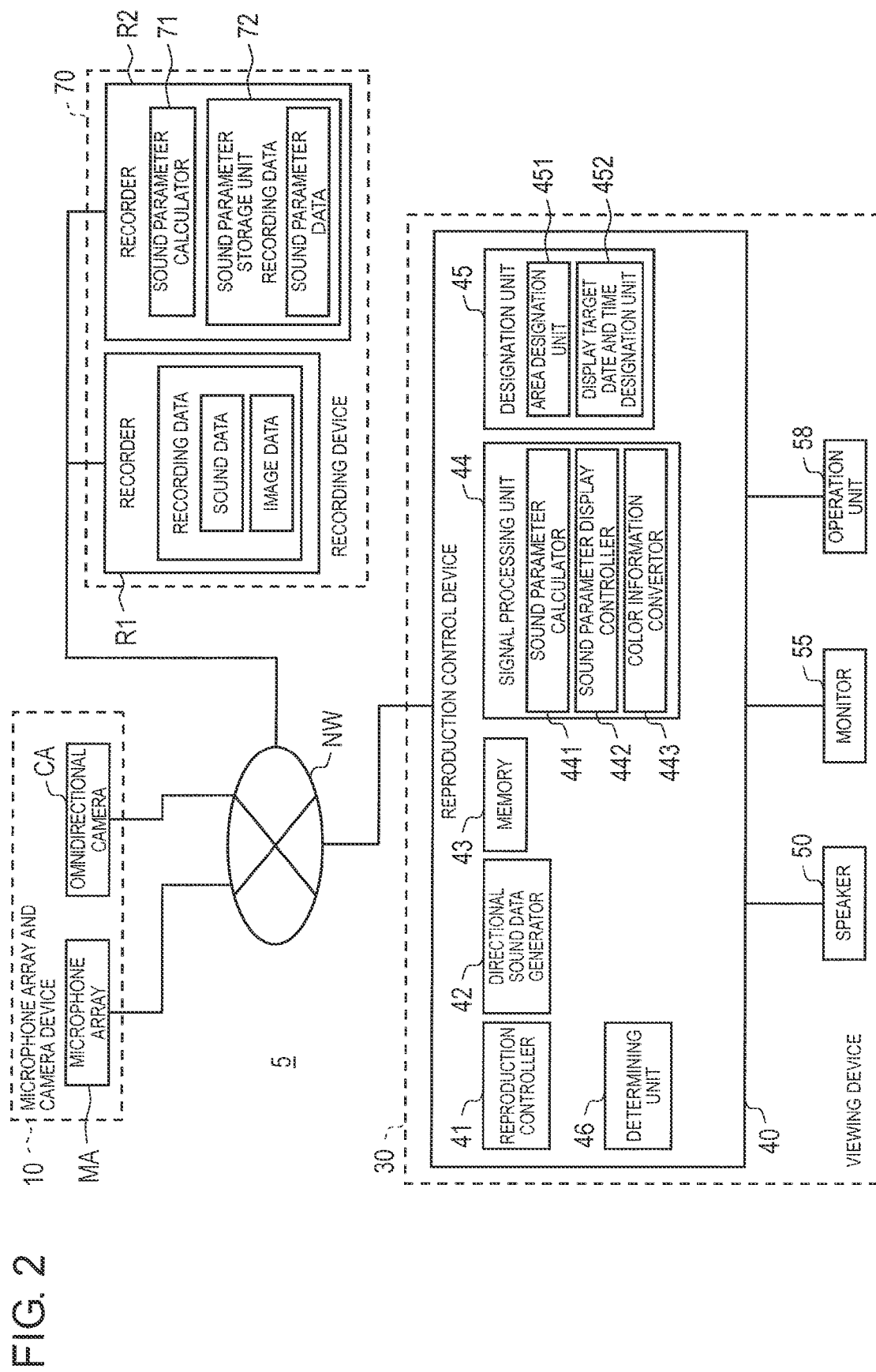
FIG. 2 is a block diagram illustrating in detail an example of a system configuration of the voice monitoring system according to the first exemplary embodiment.

Viewing device 30 is disposed in backyard 200z of store 200, displays an image (a captured image) captured by omnidirectional camera CA so as to be viewed, and further outputs the sound collected by microphone array MA to speaker 50 (see FIG. 2).

In the same manner as viewing device 30, recording device 70 as a recorder is disposed in backyard 200z of store 200 and records the image captured by omnidirectional camera CA (captured image) and an imaging time, and the sound collected by microphone array MA and a collection time in association with each other. In addition, recording device 70 repeatedly stores a sound parameter (see below) calculated at regular intervals.

FIG. 2 is a block diagram illustrating in detail an example of a system configuration of voice monitoring system 5 according to the first exemplary embodiment. Microphone array and camera device 10, viewing device 30, and recording device 70 are connected to each other so as to enable data communication via network NW. Network NW may be a wired network (for example, an intranet, the internet) or a wireless network (for example, a wireless local area network (LAN)).

Recording device 70 records various data and includes recorder R1 and recorder R2. Recorder R1 records data of the sound collected by microphone array MA and the collection time, and data of the captured image captured by omnidirectional camera CA and the imaging time in association with each other. The collection time may be a time in time information included in voice data transmitted from microphone array MA or a time when the voice data transmitted from microphone array MA is received by recorder R1. In the same manner, the imaging time may be a time in time information included in data of the captured image transmitted from omnidirectional camera CA or a time when the data of the captured image transmitted from omnidirectional camera CA is received by recorder R1.

Recorder R2 includes sound parameter calculator 71 and sound parameter storage unit 72.

Sound parameter calculator 71 calculates a sound parameter based on the sound data recorded in recorder R1 or the sound data collected by microphone array MA. In the following description, the sound parameter is a parameter indicating magnitude of the sound collected by microphone array MA and is, for example, sound pressure. The sound parameter is not limited to the sound pressure, but may be a volume level, simply the presence or absence of a voice, amount obtained by multiplying the sound pressure by a voice detection time, or the like. Details of a sound parameter calculation process of sound parameter calculator 71 are the same as a sound parameter calculation process of sound parameter calculator 441 to be described below, so the description thereof will be omitted here.

Sound parameter storage unit 72 stores the sound parameter calculated by sound parameter calculator 71 in association with time information at the time of the calculation. In FIG. 2, recording device 70 is configured to include recorder R1 and recorder R2 as separate devices, but, recorder R1 and recorder R2 may be integrated in recording device 70. In addition, as described in FIG. 2, recorder R2 may further record recording data (that is, image data and data of the imaging time, and sound data and data of the collection time) recorded in recorder R1.

Viewing device 30 is configured to include reproduction control device 40, speaker 50, monitor 55, and operation unit 58. Reproduction control device 40 causes monitor 55 to display data of the captured image captured by omnidirectional camera CA and causes speaker 50 to reproduce data of the sound collected by microphone array MA. Reproduction control device 40 includes reproduction controller 41, directional sound data generator 42, memory 43, signal processing unit 44, designation unit 45, and determining unit 46.

For example, in a case where an observer (hereinafter, referred to as "user") performs a designation operation of a certain time range, reproduction controller 41 obtains sound data and image data in the corresponding time range from the sound data and the image data recorded in recorder R1, causes speaker 50 to output the sound data, and further causes monitor 55 to display the image data.

In addition, if the observer performs the designation operation of the certain time range and a designation operation of a position on the captured image displayed on monitor 55, reproduction controller 41 instructs an emphasis process on the sound data of the designated time range to directional sound data generator 42 to be described below. Reproduction controller 41 reproduces the emphasis-processed voice output from directional sound data generator 42 by causing speaker 50 to output the voice.

For example, as a directional sound emphasis unit, directional sound data generator 42 performs the emphasis process on a voice in a direction from microphone array MA toward a sound source position corresponding to a position on the captured image designated by operation of the observer such as a manager or the like, as an orientation direction according to an instruction of reproduction controller 41, by using the sound data recorded in recorder R1. Specifically, directional sound data generator 42 generates data of the voice in which the voice in the orientation direction is emphasized by forming directivity of the voice in the orientation direction.

Memory 43 is configured by using, for example, a random access memory (RAM) or a hard disk drive (HDD) and stores various information (see below) such as the sound parameter calculated by sound parameter calculator 441, cumulative time value F of the sound parameter for a certain period of time, or the like is stored. Further, memory 43 stores various information such as recording date and time, a display time unit, coordinates of the designated area, a reproduction list, and the like displayed on GUI 100 (see FIG. 5) to be described below.

Signal processing unit 44 generates a captured image distributed from omnidirectional camera CA (that is, the image constituting the current live video) or a sound source visual image (see below) superimposed on the captured image recorded in recorder R1 (that is, the image constituting the past recording video). Signal processing unit 44 includes at least sound parameter calculator 441, sound parameter display controller 442, and color information convertor 443.

Sound parameter calculator 441 calculates a sound parameter (for example, sound pressure) for each of pixels constituting the image data based on the image data of the captured image captured by omnidirectional camera CA and the sound data of the sound collected by microphone array MA. In each of the embodiments including the present embodiment, for example, when calculating the sound parameter, after forming directivity (see below) in a direction from microphone array MA toward a position on monitoring area SA corresponding to the pixel to be calculated and performing the emphasis process on the voice in the direction, sound parameter calculator 441 determines the presence or absence of the voice so as to calculate the sound pressure. In addition, for each of the pixels, sound parameter calculator 441 generates a sound pressure map in which a calculation value of the sound pressure is assigned to the position of the corresponding pixel. Sound parameter calculator 441 generates the sound pressure map in which the sound pressure value calculated in units of pixels is assigned to the position of the corresponding pixel, but the sound pressure is not calculated for each of the pixels and the sound pressure map may be generated by calculating an average value of the sound pressure values in units of pixel blocks included in a predetermined number of pixels (for example, 2×2=4 or 3×3=9) and assigning the average value of the corresponding sound pressure values to the predetermined number of corresponding pixels.

Sound parameter display controller 442 performs display control so as to superimpose the sound source visual image on the captured image distributed from omnidirectional camera CA (that is, the image constituting the current live video) or the captured image recorded in recorder R1 (that is, the image constituting the past recording video). Details of an operation of sound parameter display controller 442 will be described below.

Color information convertor 443 calculates respective RGB values and generates the sound source visual image corresponding to the RGB value based on the sound parameter calculated by sound parameter calculator 441. A process of generating the sound source visual image corresponding to color information (RGB value) by color information convertor 443 will be described below.

Designation unit 45 includes area designation unit 451 and display target date and time designation unit 452. Area designation unit 451 designates designated area FR (see FIG. 5), which is an area in which the user wants to hear a voice, by a user operation. Display target date and time designation unit 452 designates date and time at which the user wants to listen to the voice by a user operation. The user instructs a voice section (time range) on a time axis by using recording date and time selecting unit 104, display time unit setting unit 105, and display target range setting unit 106 on GUI 100 (see FIG. 5) so that the date and time at which the user wants to listen to the voice is designated.

Determining unit 46 determines whether or not the time range designated according to the user operation by display target range setting unit 106 is smaller than storage interval AA1 as a first interval of the voice parameter already recorded in recorder R2. Determining unit 46 is used in an eighth exemplary embodiment to be described below and details of the operation of determining unit 46 will be described below.

Speaker 50 outputs the sound data of the voice collected in real time by microphone array MA or the sound data recorded in recorder R1.

Figure 5:
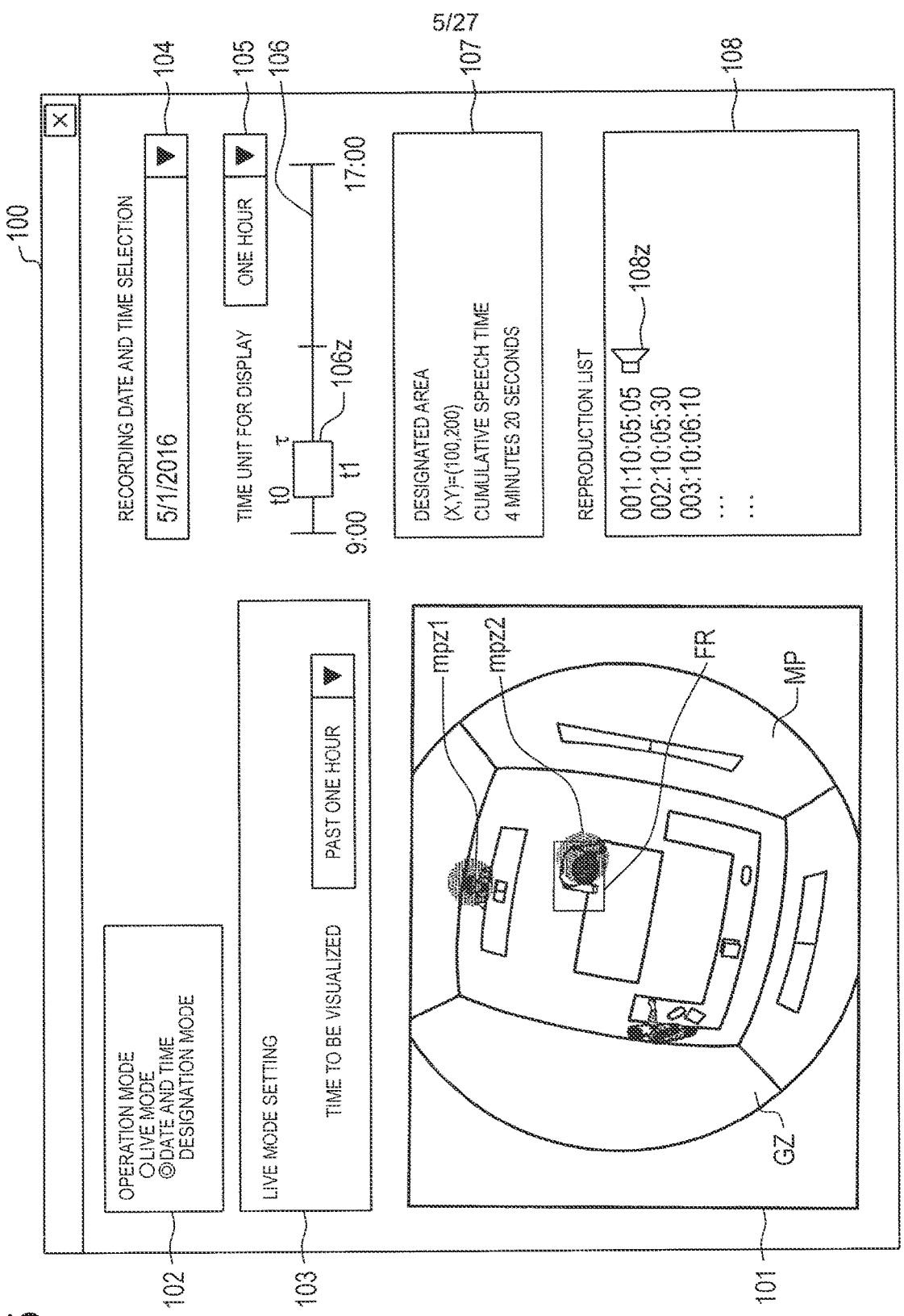
FIG. 5 is a diagram illustrating an example of a GUI displayed on a monitor.

Monitor 55 displays graphical user interface (GUI) 100 (see FIG. 5). Details of GUI 100 will be described.

Operation unit 58 receives an operation instruction from the user for GUI 100, and may be a touch panel integrated with monitor 55 in addition to an input device such as a mouse, a keyboard, or the like. An example of the operation instruction from the user includes designation of a video/audio file, designation of a position of a designated area, designation of a time range of a voice to be displayed, an instruction to start reproduction, and the like.

Figure 3:
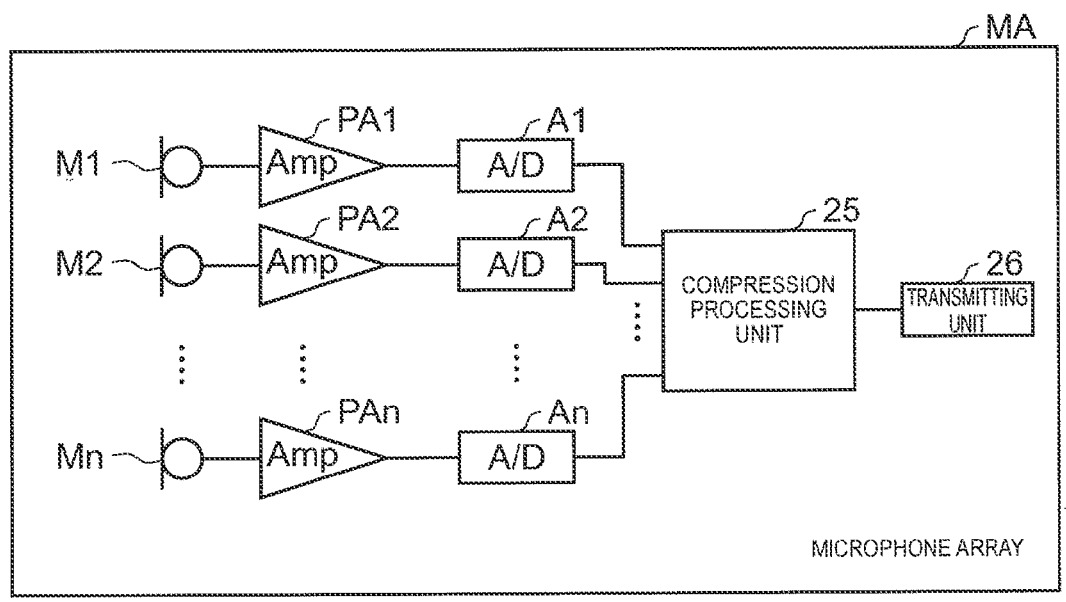
FIG. 3 is a block diagram illustrating in detail an example of an internal configuration of a microphone array.

FIG. 3 is a block diagram illustrating in detail an example of an internal configuration of microphone array MA. Microphone array MA includes a plurality of microphones M1 to Mn (for example, n=8, 16, or 32), a plurality of amplifiers PA1 to PAn for respectively amplifying output signals of the plurality of microphones M1 to Mn, a plurality of A/D convertors A1 to An for respectively converting analog signals output from the respective amplifiers PA1 to PAn into digital signals, compression processing unit 25, and transmitting unit 26.

Compression processing unit 25 generates a packet of voice data based on the digital voice signals output from A/D convertors A1 to An. Transmitting unit 26 transmits the packet of the voice data generated by compression processing unit 25 to viewing device 30 or recording device 70 via network NW.

In this manner, in microphone array MA, after amplifiers PA1 to PAn amplifies the output signals of microphones M1 to Mn and A/D convertors A1 to An converts the resultant signals into the digital voice signal, compression processing unit 25 generates the packet of the voice data. Microphone array MA transmits the packet of the voice data to viewing device 30 or recording device 70 via network NW.

Figure 4:
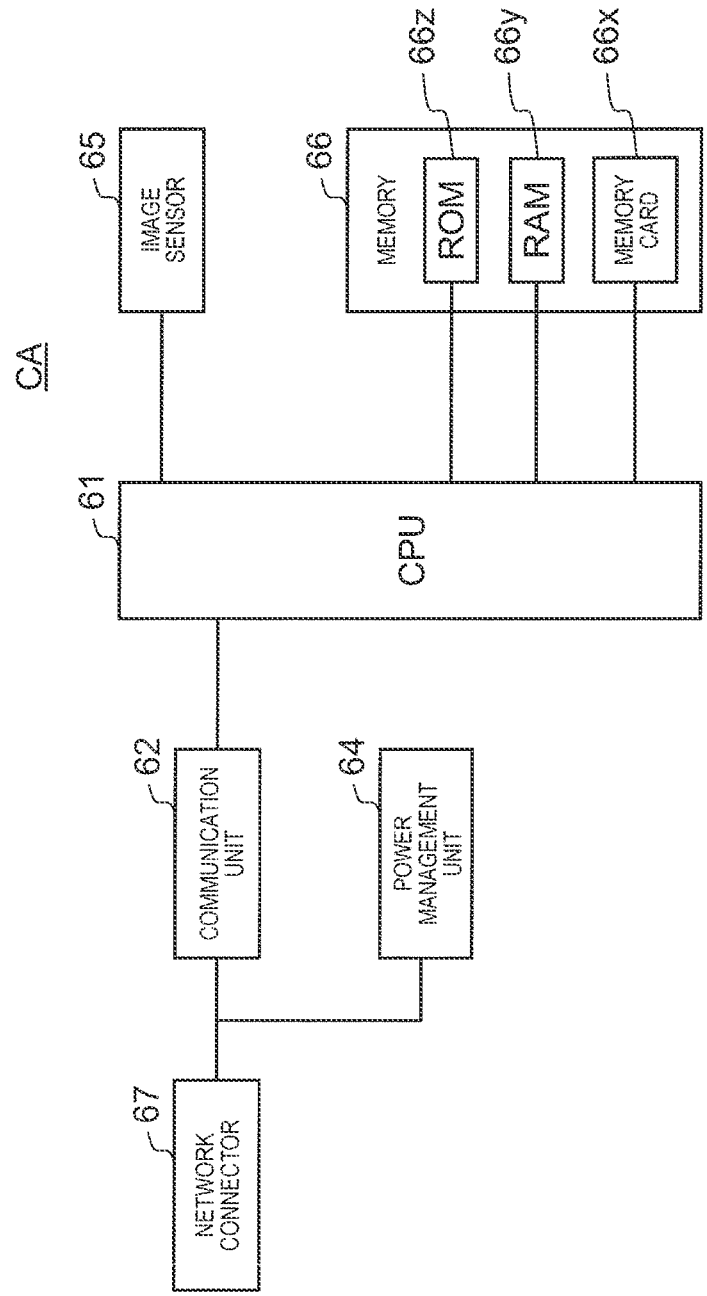
FIG. 4 is a block diagram illustrating in detail an example of an internal configuration of an omnidirectional camera.

FIG. 4 is a block diagram illustrating in detail an example of an internal configuration of omnidirectional camera CA. Omnidirectional camera CA includes CPU 61, communication unit 62, power management unit 64, image sensor 65, memory 66, and network connector 67.

CPU 61 comprehensively controls each of units of omnidirectional camera CA. Image sensor 65 images monitoring area SA to acquire image data and is configured with a complementary metal oxide semiconductor (CMOS) sensor. Instead of the CMOS sensor, a charge coupled device (CCD) sensor may be used.

Memory 66 includes ROM 66z in which an operation program and data of a setting value are stored, RAM 66y for storing image data and work data, and memory card 66x which is detachably connected to omnidirectional camera CA and stores various data.

Communication unit 62 is a network interface (I/F) which controls data communication with network NW connected via network connector 67.

Power management unit 64 supplies DC power to each of the units of omnidirectional camera CA and supplies DC power to devices connected to network NW via network connector 67. Network connector 67 is a connector which transmits communication data such as image data and the like and can supply power via a network cable.

In the present embodiment, the omnidirectional camera is used, but a PTZ camera capable of panning, tilting and zooming or a fixed point camera with a fixed angle of view may be used instead of the omnidirectional camera.

FIG. 5 is a diagram illustrating an example of GUI 100 displayed on monitor 55. GUI 100 is a user interface displayed on monitor 55 and specifically, includes display screen 101, operation mode setting unit 102, live mode setting unit 103, recording date and time selecting unit 104, display time unit setting unit 105, display target range setting unit 106, setting information display unit 107, and reproduction list 108. For example, GUI 100 is generated by sound parameter display controller 442 and displayed on monitor 55, and the same applies to each of the following embodiments.

Captured image GZ (that is, fisheye image) captured by omnidirectional camera CA and the sound source visual image (voice heat map MP) superimposed on the captured image are displayed on display screen 101. The sound source visual image (voice heat map MP) is a voice heat map generated by signal processing unit 44 based on the sound collected by microphone array MA. That is, the voice heat map is map data for visually indicating at which position a sound source exists in captured image GZ. The voice heat map may be overall map data including an entire area of captured image GZ as a target or may be partial map data including only a position at which the sound source exists in captured image GZ. On display screen 101 illustrated in FIG. 5, designated area (selected area) FR designated (selected) by the user operation is displayed as a blue rectangular frame as a location at which a sound parameter is large (in other words, a location at which a voice occurs, that is, a sound source). In addition, areas mpz1 and mpz2 of which a sound parameter is larger than a sound parameter of designated area FR are displayed in an approximately circular shape of red as another sound source position.

Operation mode setting unit 102 includes a radio button selectable by the user. For example, operation mode setting unit 102 can select any one of a live mode for displaying a composite image (see above) displayed on display screen 101 in real time and a date and time designation mode for displaying a composite image (see above) corresponding to the past designated date and time based on the sound parameter calculated using the past image data and sound data recorded in recording device 70. When one of the modes is selected, a color of the radio button corresponding to the selected mode changes. In FIG. 5, the date and time designation mode is selected. In the following description, it is assumed that the date and time designation mode is selected.

Live mode setting unit 103 includes a pull-down menu selectable by the user and sets a selected time to be visualized. In FIG. 5, for example, "past one hour" is set as the time to be visualized. That is, for example, a use of the sound data and the image data from the present to the past one hour ago is designated so as to generate the composite image described above.

Recording date and time selecting unit 104 includes a pull-down menu selectable by the user and sets a selected recording date and time. In FIG. 5, for example, the date of "2016/5/1" is set as the date and time information of the recording. The pull-down menu includes an item, in which a time zone also can be set, in addition to the date.

Display time unit setting unit 105 includes a pull-down menu selectable by the user and sets a selected display time unit. In FIG. 5, for example, "one hour" is set.

Display target range setting unit 106 includes a slide bar for designating a time zone (a time range) which is a display target of the composite image described above and sets the time zone (the time range) of the display target by the user moving slider 106z on a time axis. Slider 106z has, for example, a rectangular shape. A left side of a rectangle indicating slider 106z indicates display start time t0 of the time zone (the time range) and a length of the rectangle indicates display time unit τ (here, one hour). A right side of the rectangle indicating slider 106z indicates display end time (t0+τ). In FIG. 5, for example, the time zone to be displayed (that is, a start time and an end time of display time unit t) can be changed on the time axis of "9:00 to 17:00". The fact that the slide bar of display target range setting unit 106 is illustrated within the time zone of "9:00 to 17:00" is merely an example, and may be illustrated within "0:00 to 23:59" as another example.

Setting information display unit 107 displays designated area FR designated by the user operation and a cumulative speech time of designated area FR. Designated area FR is a rectangular area represented by center coordinates (X, Y) of designated area FR. In FIG. 5, for example, the center coordinates (X, Y) of designated area FR are (100, 200). In addition, the cumulative speech time is, for example, 4 minutes 20 seconds.

Reproduction list 108 displays the start time of a voice detection period in which a voice is detected in designated area FR on time series, within the time range designated by the user operation. When selecting a start time of any one of voice detection periods in reproduction list 108, viewing device 30 can reproduce a voice from the start time by causing speaker 50 to output the voice. In FIG. 5, for example, the voice detection periods having "10:05:05", "10:05:30", and "10:06:10" as the start time are displayed in order of label. In addition, for the voice detection period of "10:05:05" currently being reproduced, for example, mark 108z is illustrated by sound parameter display controller 442.

An operation of voice monitoring system 5 having the configuration described above will be described.

First, in recording device 70, a recording operation of an image captured by omnidirectional camera CA (that is, image recording), a recording operation of a voice collected by microphone array MA (that is, voice recording), and an operation of calculating and storing a sound parameter will be described.

Figure 6:
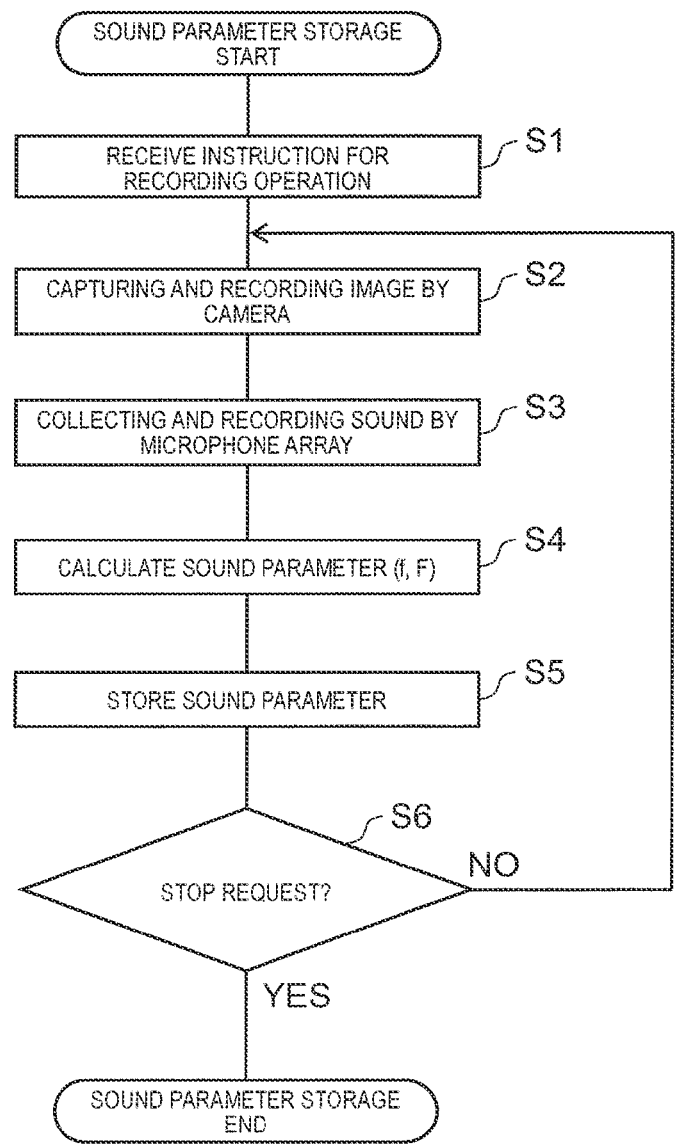
FIG. 6 is a flowchart for explaining in detail an example of each of operation procedures of calculating and storing a sound parameter in a recorder according to the first exemplary embodiment.

FIG. 6 is a flowchart for explaining in detail an example of each of operation procedures of calculating and storing the sound parameter in recorder R2 according to the first exemplary embodiment. Operation unit 58 of viewing device 30 receives an instruction for the recording operation by the user (S1). When receiving the instruction for the recording operation by the user, with the instruction as a trigger, recorder R1 starts recording image data of the image captured by omnidirectional camera CA (S2). In addition, recorder R1 starts recording voice data of the voice collected by microphone array MA (S3).

Sound parameter calculator 71 of recorder R2 calculates a sound pressure which is a sound parameter based on the image data and the voice data recorded in recorder R1 (S4).

Figure 7:
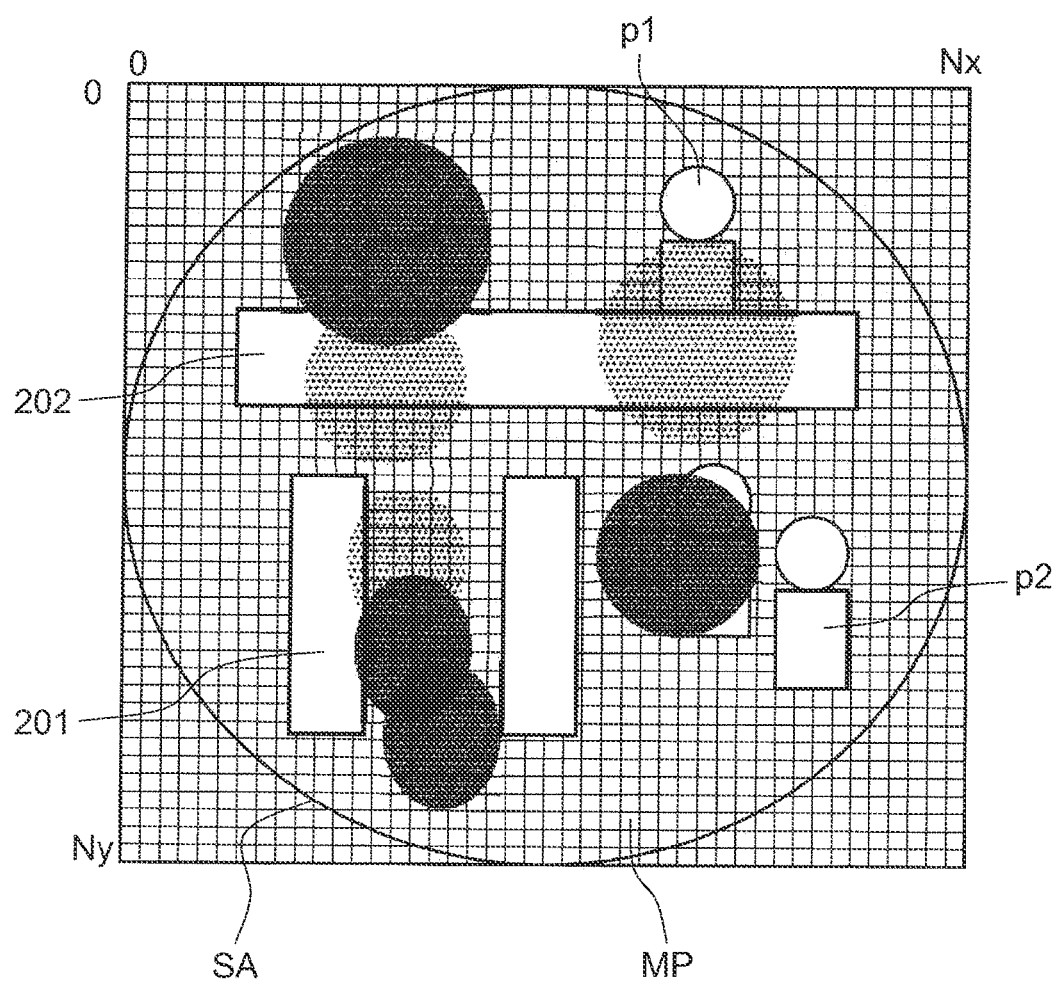
FIG. 7 is a diagram for explaining an example of calculation of the sound parameter.

FIG. 7 is a diagram for explaining an example of calculation of the sound parameter. In step S4 in FIG. 6, the sound parameter is calculated for each of pixels constituting captured image GZ of monitoring area SA illustrated in FIG. 7. In FIG. 7, the sound parameter for each of the pixels is superimposed on captured image GZ. Captured image GZ is partitioned into, for example, squares of 0 to Nx and 0 to Ny (that is, pixels). As an example, Nx=210 and Ny=210 may be given. The sound parameter indicating magnitude of the voice is calculated with the square as a unit.

Here, magnitude of a voice (sound pressure) at certain time t at coordinates (i, j) on captured image GZ is represented by f(t, i, j). The magnitude of the voice at certain time t may be an instantaneous value or may be an average value, a maximum value, or an additional value of a certain time width (for example, one minute). Sound parameter calculator 71 of recorder R2 calculates cumulative time value $F_{t0,\tau}(i, j)$ of the magnitude of the voice from display start time t0 to display end time (t0+τ) (see FIG. 5) according to Equation (1).

Equation (1)

$$F_{t0,\tau}(i, j) = \sum_{t=t0}^{(t0+\tau)} f(t, i, j) \quad (1)$$

Here, sound parameter calculator 441 performs the same process as the calculation process by sound parameter calculator 71 of recorder R2 as described above. In addition, color information convertor 443 normalizes cumulative time value $F_{t0,\tau}(i, j)$ of the magnitude of the voice at all of the coordinates (i, j) on captured image GZ and converts a normalized value into an RGB value constituting voice heat map MP (see Equations (2) to (4)). $R_{t0,\tau}(i, j)$ which is a value of red (that is, R value), $G_{t0,\tau}(i, j)$ which is a value of green (that is, G value), and $B_{t0,\tau}(i, j)$ which is a value of blue (that is, B value) are respectively represented by Equations (2), (3), and (4).

Equation (2)

$$R_{t0,\tau}(i, j) = \frac{1}{\|F\|} F_{t0,\tau}(i, j) * k_R \quad (2)$$

Equation (3)

$$G_{t0,\tau}(i, j) = \frac{1}{\|F\|} F_{t0,\tau}(i, j) * k_G \quad (3)$$

Equation (4)

$$B_{t0,\tau}(i, j) = \frac{1}{\|F\|} F_{t0,\tau}(i, j) * k_B \quad (4)$$

In Equations (2) to (4), $k_R$, $k_G$, and $k_B$ are constants respectively indicating intensities of red, green, and blue elements. $\|F\|$ indicates norm F. Here, color information convertor 443 represents a sound source visual image by the RGB values, but, for example, the sound source visual image may be represented by other color information such as YUV value or the like and may be represented without using all of the values of the RGB value of three colors. Furthermore, color information convertor 443 may represent the sound source visual image with opacity using an alpha value.

FIG. 8 is a diagram illustrating an example of a structure of a file storing the sound parameter according to the first exemplary embodiment. The file, in which the sound parameter is stored, is configured to include a column of a file header, a column of a file size, a column of a recording date and time, a column of a recording duration, a column of "fmt" (fmt (format) chunk), a column of a format version, and a column of "data" (data chunk). Each of elements constituting the sound parameter has a size of 4 bytes. Real data of the sound parameter is stored in the column of "data" (data chunk).

Returning to FIG. 6, as some pieces of the recording data in sound parameter storage unit 72, sound parameter storage unit 72 stores the sound parameter (for example, including f(t, i, j) indicating the magnitude of the voice and cumulative time value $F_{t0,\tau}(i, j)$ of the magnitude of the voice) calculated by sound parameter calculator 71 (S5). At this time, time information such as recording (image recording and voice recording) date and time is also stored as some pieces of the recorded data.

Recording device 70 confirms whether or not there is a stop request of recording by the user via operation unit 58 (S6). In a case where there is no stop request (NO in S6), the process of recording device 70 returns to step S2 and the same process is repeated until there is the stop request. On the other hand, in a case where there is the stop request (YES in S6), recording device 70 terminates the present operation.

Figure 9:
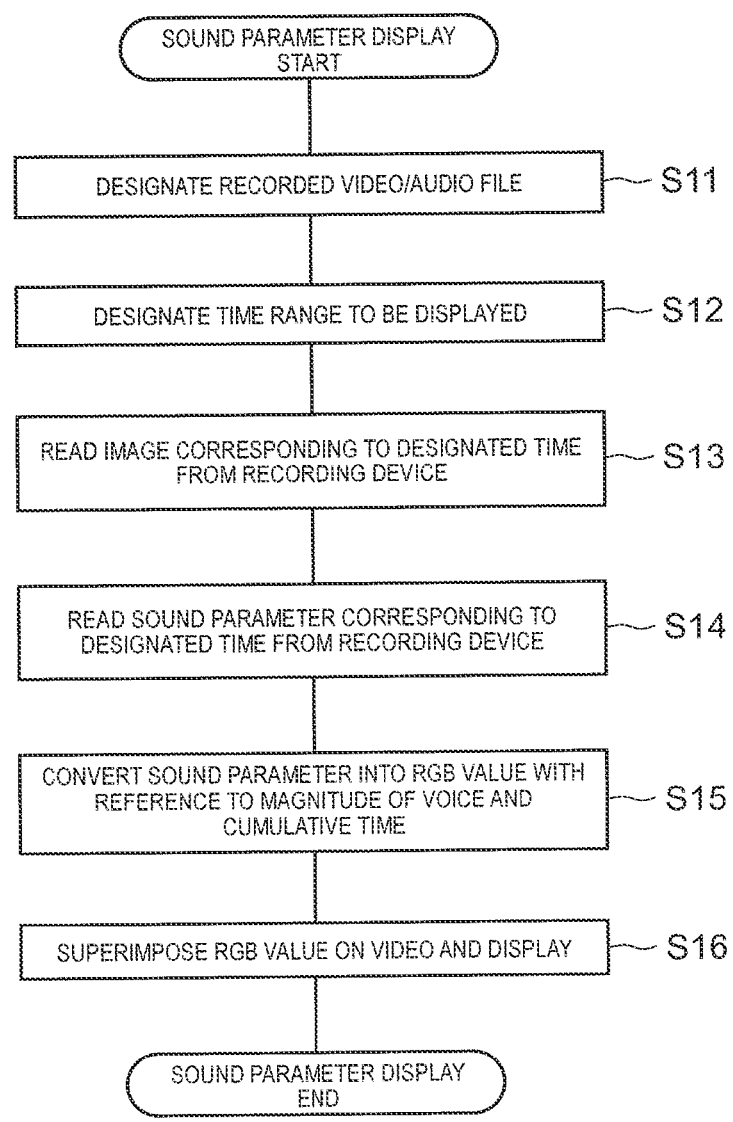
FIG. 9 is a flowchart for explaining in detail an example of an operation procedure of displaying the sound parameter according to the first exemplary embodiment.

FIG. 9 is a flowchart for explaining in detail an example of an operation procedure of displaying the sound parameter according to the first exemplary embodiment. Operation unit 58 of viewing device 30 receives a video/audio file including the image data and the sound data recorded in recorder R1 designated by the user operation (S11). In a case of designating the video/audio file, information of the recording date and time set by recording date and time selecting unit 104 is used.

Display target date and time designation unit 452 receives a time range of a display target designated by the user operation via operation unit 58 (S12). Reproduction control device 40 reads a video corresponding to the designated time range from recorder R1 (S13).

Sound parameter calculator 441 reads a sound parameter corresponding to the time range designated in step S12 from recorder R2 (S14). Based on the read sound parameter, color information convertor 443 converts cumulative time value F of the magnitude of the voice into RGB values according to Equations (2) to (4) (S15). The RGB value is set to 256 levels within a range of 0 to 255. For example, color information convertor 443 calculates a value of blue color B according to Equation (5) and calculates a value of red color R according to Equation (6).

Equation (5)

$$B_{t0,\tau}(i, j) = \begin{cases} \frac{1}{\|F\|} F_{t0,\tau}(i, j) * 255 * 0.2, & \frac{1}{\|F\|} F_{t0,\tau}(i, j) < 0.2 \\ 51, & \frac{1}{\|F\|} F_{t0,\tau}(i, j) \geq 0.2 \end{cases} \quad (5)$$

Equation (6)

$$B_{t0,\tau}(i, j) = \begin{cases} \left(\frac{1}{\|F\|} F_{t0,\tau}(i, j) - 0.2\right) * 255 \div 0.8, & \frac{1}{\|F\|} F_{t0,\tau}(i, j) \geq 0.2 \\ 0, & \frac{1}{\|F\|} F_{t0,\tau}(i, j) < 0.2 \end{cases} \quad (6)$$

In the conversion into the RGB value, for example, in a case where a value (for convenience, referred to as "normalized value") obtained by normalizing cumulative time value $F_{t0,\tau}(i, j)$ of the magnitude of the voice is smaller than "0.2", in this pixel, a blue color is developed and a red color is not developed according to the normalized value. Therefore, the pixel represents a color within a range from transparent to bluish.

In addition, in a case where the normalized value is equal to or larger than "0.2", in the pixel, the blue color is developed with a constant B value (here, "51") and the red color is developed according to the normalized value. Accordingly, as the voice increases, the pixel changes from colorless to dark blue to red.

Sound parameter display controller 442 superimposes the sound source visual image (voice heat map MP) based on the RGB value converted in step S15 on captured image GZ captured by omnidirectional camera CA (for example, captured image GZ at a first time of the time range designated by the user operation. The same is applied to the following), generates a composite image, and causes monitor 55 to display the resultant image (S16). After then, sound parameter display controller 442 terminates the present operation. Here, the case where sound parameter calculator 441 calculates cumulative time value F of the magnitude of the voice is described, but sound parameter display controller 442 may calculate cumulative time value F.

As described in FIG. 5, in GUI 100 displayed on monitor 55, if the display time unit is set to, for example, "one hour" by the pull-down menu of display time unit setting unit 105, display time unit τ corresponding to a width (the length of the rectangle) of slider 106z disposed on the time axis of display target range setting unit 106 is changed. In FIG. 5, a center position of slider 106z is at time t1 and the composite image of captured image GZ and voice heat map MP at time t1 (for example, 10:05:05) is displayed on display screen 101. In voice heat map MP, two areas mpz1 and mpz2, in which voices are large, are displayed in an approximately circular shape.

Figure 10:
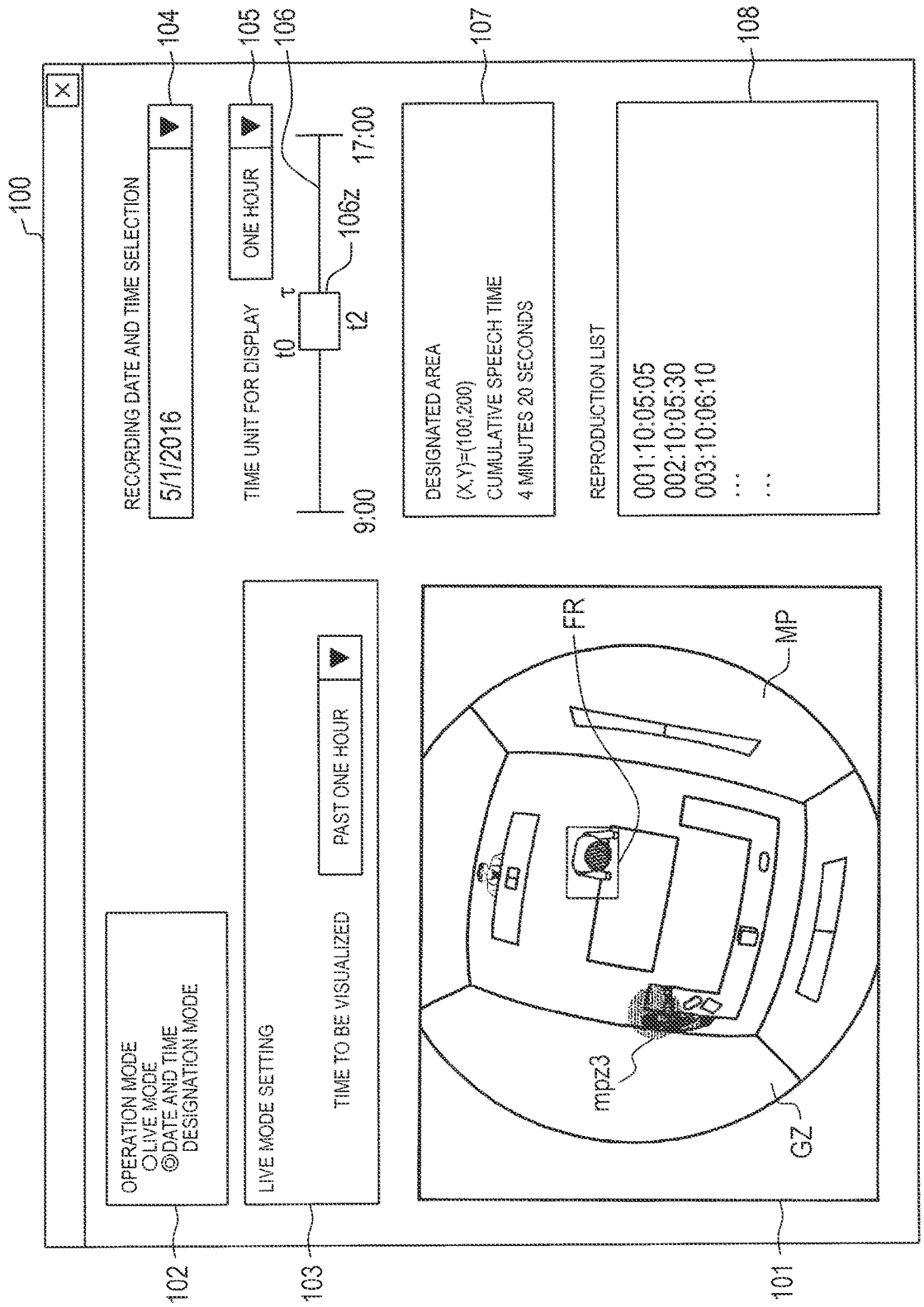
FIG. 10 is a diagram illustrating an example of a GUI displayed at time t2 on the monitor.

For example, when the user moves slider 106z in a right direction to change slider 106z from time t1 to time t2, captured image GZ is changed and voice heat map MP is changed, and voice heat map MP superimposed on captured image GZ at time t2 is displayed. FIG. 10 is a diagram illustrating an example of GUI 100 displayed at time t2 on monitor 55. On display screen 101 at time t2, as the speaking person is changed in captured image GZ, it seemed that area mpz3 in which a voice is large is moved as compared with FIG. 5.

In this manner, in voice monitoring system 5 according to the first exemplary embodiment, omnidirectional camera CA images monitoring area SA. Microphone array MA collects voices in monitoring area SA. Recording device 70 stores the captured image captured by omnidirectional camera CA and the imaging time, and the sound collected by microphone array MA in association with each other. Based on the sound collected by microphone array MA during imaging by omnidirectional camera CA, sound parameter calculators 71 and 441 calculates a sound parameter indicating the magnitude of the voice of monitoring area SA at the imaging time for each of predetermined units of pixels constituting the captured image of monitoring area SA, for each of certain times. Sound parameter storage unit 72 stores the sound parameter calculated by sound parameter calculators 71 and 441 in association with position information on the captured image at the imaging time. Based on the sound parameter of the pixel for each of predetermined units calculated by sound parameter calculators 71 and 441, sound parameter display controller 442 superimposes the sound source visual image on the pixels, constituting the captured image of monitoring area SA for each of predetermined units and causes monitor 55 to display the resultant image. At this time, based on cumulative time value F of the magnitude of the voice in the time range of the sound parameter stored in sound parameter storage unit 72, sound parameter display controller 442 superimposes the sound source visual image on the pixels, constituting the captured image of monitoring area SA, for each of predetermined units and causes monitor 55 to display the resultant image, according to designation of the time range.

Accordingly, voice monitoring system 5 can specifically visualize the sound source in monitoring area SA by using the sound parameter indicating the magnitude of the sound collected by microphone array MA. In addition, when visualizing the sound source, the color information (for example, the RGB value) can be presented based on the magnitude of the voice and the cumulative time (duration). Therefore, it is possible to visualize the voice and the like from the clerk and the customer making conversation with each other in the store and to analyze an attitude of the clerk and a tendency of the customer. Furthermore, in a case of analyzing the voice in the store, not only the magnitude of the voice but also the amount of conversations which is a cumulative time of voices (voice duration) is obtained, so that it is possible to collect and analyze large amount of conversations from the past as information. In addition, it is possible to perform the analysis in more detail by being combined with the video. Further, it is possible to visualize distribution of the magnitude of the voice collected in monitoring area SA in real time. In this manner, it is possible to visualize and analyze the voice. Therefore, it is possible to visually present to the user which position in monitoring area SA the conversation is frequently performed and to recognize a tendency of the customer speaking in the store.

Second Exemplary Embodiment

Since a system configuration of voice monitoring system 5 according to a second exemplary embodiment is the same as the system configuration of the voice monitoring system according to the first exemplary embodiment, repeated description will be simplified or omitted and different contents will be described.

In the first exemplary embodiment, viewing device 30 represents the magnitude of the voice at certain time t at coordinates (i, j) on the captured image with f(t, i, j) as a sound pressure parameter and calculates cumulative time value $F_{t0,\tau}(i, j)$ of the magnitude of the voice by using the f(t, i, j). In the second exemplary embodiment, binarization (that is, compression) is performed on the amount of information of the voice depending on the presence or absence of voice detection, and then calculates cumulative time value $F_{t0,\tau}(i, j)$ of the magnitude of the voice.

Specifically, as described in Equation (7), sound parameter calculator 71 calculates parameter f'(t, i, j) indicating the presence or absence of the voice by comparing f(t, i, j) of the magnitude of the voice at the coordinates (i, j) at certain time t with threshold value Vdet for detecting the voice.

Equation (7)

$$f'(t, i, j) = \begin{cases} 0, & f(t, i, j) < V\,det \\ 1, & f(t, i, j) \geq V\,det \end{cases} \quad (7)$$

Threshold value Vdet may not be a constant but may be value Vdet(t) which varies with time, for example. Sound parameter calculator 71 calculates cumulative time value $F_{t0,\tau}(i, j)$ of the magnitude of the voice from display start time t0 to display end time (t0+τ) (see FIG. 5) according to Equation (8).

Equation (8)

$$F_{t0,\tau}(i, j) = \sum_{t=t0}^{\tau} f'(t, i, j) \tag{8}$$

Sound parameter calculator 441 performs the same process as the calculation process by sound parameter calculator 71 of recorder R2 as described above. In addition, in the same manner as the first exemplary embodiment, color information convertor 443 normalizes cumulative time value $F_{t0,\tau}(i, j)$ of the magnitude of the voice at all of the coordinates (i, j) on captured image GZ and converts a normalized value into an RGB value constituting voice heat map MP.

In this manner, in voice monitoring system 5 according to the second exemplary embodiment, sound parameter calculators 71 and 441 calculate the sound parameter and cumulative time value F of the magnitude of the voice for the magnitude of the voice by using binarization information indicating the presence or absence of the voice detection. In this manner, since the presence or absence of the voice is detected and the information amount of the sound is compressed, cumulative time value $F_{t0,\tau}(i, j)$ is calculated while compressing the amount of information of the voice, it is possible to considerably reduce a processing load in sound parameter calculators 71 and 441.

Third Exemplary Embodiment

Since a system configuration of voice monitoring system 5 according to a third exemplary embodiment is the same as the system configuration of the voice monitoring system according to the first exemplary embodiment, repeated description will be simplified or omitted and different contents will be described.

When converting cumulative time value $F_{t0,\tau}(i, j)$ of the magnitude of the voice in the pixel for each of predetermined units into the RGB value and assigning a color to the sound source visual image, as the time range designated by the user operation as a display target increases, viewing device detects the voice over entire monitoring area SA without omission. For this reason, the color is assigned to entire display screen 101 of captured image GZ. In order to avoid that it is difficult to watch display screen 101 by assigning the color to entire display screen 101, in the third exemplary embodiment, the RGB values corresponding to the sound parameters are respectively calculated only for cumulative time value $F_{t0,\tau}(i, j)$ of the magnitude of the voice satisfying a predetermined condition.

Specifically, viewing device 30 uses information of "how much time, a voice is detected" within the time range designated by the user operation. Based on a condition that the voice is detected in what percentage or more of the time range, viewing device 30 assigns the color to the sound source visual image of the corresponding pixel.

Accordingly, it is possible to suppress display of the sound source visual image, to which the color is assigned, around an extra sound source which the user does not need in the captured image GZ, on the screen. As an example, in a case where the designated time range is 30 minutes, viewing device 30 may not assign a color to a sound source visual image displayed around a sound source of a voice, the voice not satisfying 3 minutes corresponding to 10% of 30 minutes.

Figure 11:
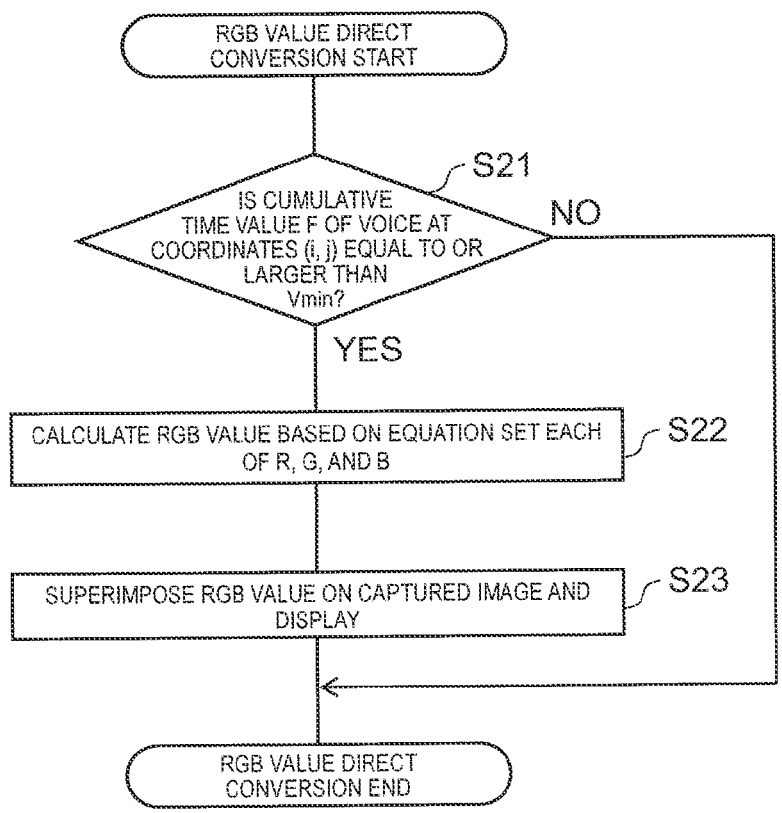
FIG. 11 is a flowchart for explaining in detail an example of a procedure of conversion operation to an RGB value according to the third exemplary embodiment.

FIG. 11 is a flowchart for explaining in detail an example of a procedure of conversion operation to an RGB value according to the third exemplary embodiment. Color information convertor 443 determines whether or not cumulative time value F of the magnitude of the voice at the coordinates (i, j) is equal to or larger than threshold value Vmin (S21). Here, threshold value Vmin is a threshold value for determining whether or not to assign a color to a sound source visual image displayed around the sound source in which the voice is detected. For example, in a case where the time range designated by the user operation is Tsel and display threshold p %, threshold Vmin is represented by Vmin=Tsel×P/100. Here, the display threshold indicates a relative proportion capable of determining that the sound source visual image, to which the color is assigned, can be displayed around the sound source, in which the voice is detected, according to the time range designated by the user operation.

In a case where cumulative time value F of the magnitude of the voice is equal to or larger than threshold value Vmin (YES in S21), color information convertor 443 converts cumulative time value F of the magnitude of the voice into the RGB value according to, for example, Equations (9) and (10) (S22). A value of B (blue) in Equation (9) and a value of R (red) in Equation (10) are respectively exemplified, and a value of G (green) is zero, for example. Further, the value of G (green) may also be set so as to be changed according to the magnitude of cumulative time value F of the magnitude of the voice as Equation (9) or (10).

Equation (9)

$$B_{t0,\tau}(i, j) = \begin{cases} 0, & \frac{1}{\|F\|}F_{t0,\tau}(i, j) < V_{min} \\ \frac{1}{\|F\|}F_{t0,\tau}(i, j)*255*(V_{min}-0.5), & \frac{1}{\|F\|}F_{t0,\tau}(i, j) \geq 0.2 \\ 51, & 0.5 < \frac{1}{\|F\|}F_{t0,\tau}(i, j) \end{cases} \tag{9}$$

Equation (10)

$$R_{t0,\tau}(i, j) = \begin{cases} \left(\frac{1}{\|F\|}F_{t0,\tau}(i, j) - 0.2\right)*255 \div 0.8, & \frac{1}{\|F\|}F_{t0,\tau}(i, j) \geq 0.5 \\ 0, & \frac{1}{\|F\|}F_{t0,\tau}(i, j) < 0.5 \end{cases} \tag{10}$$

As an example, in the conversion to the RGB value, threshold Vmin is set to a value smaller than "0.5". In a case where a value obtained by normalizing cumulative time value $F_{t0,\tau}(i, j)$ of the magnitude of the voice is smaller than threshold value Vmin, the B value of blue represented by $B_{t0,\tau}(i, j)$ is "0" and in a case where the value obtained by normalizing cumulative time value $F_{t0,\tau}(i, j)$ of the magnitude of the voice is less than 0.5, the R value of red represented by $R_{t0,\tau}(i, j)$ is "0".

In addition, in a case where the value obtained by normalizing cumulative time value $F_{t0,\tau}(i, j)$ of the magnitude of the voice is equal to or larger than threshold value Vmin and is less than "0.5", the B value of blue is changed according to the value obtained by normalizing cumulative time value $F_{t0,\tau}(i, j)$ of the magnitude of the voice and the R value of red is "0". In this case, the pixel becomes bluish according to the magnitude of the voice.

Furthermore, in a case where the value obtained by normalizing cumulative time value $F_{r0,\tau}(i, j)$ of the magnitude of the voice is equal to or larger than "0.5", the B value of blue is a fixed value of "51" and the R value of red is changed according to the value obtained by normalizing cumulative time value $F_{r0,\tau}(i, j)$ of the magnitude of the voice. Therefore, as the voice becomes larger, the red color becomes stronger. Accordingly, as the voice of the sound source increases, viewing device 30 changes the color of the sound source visual image corresponding to the corresponding pixel from colorless to blue to red.

Sound parameter display controller 442 generates a composite image by superimposing the sound source visual image (voice heat map MP) based the RGB value converted in step S22 on captured image GZ captured by omnidirectional camera CA and causes monitor 55 to display the resultant image (S23). After then, sound parameter display controller 442 terminates the present operation.

In this manner, in voice monitoring system 5 according to the third exemplary embodiment, sound parameter display controller 442 displays voice heat map MP (sound source visual image) with the color information based on a relative value between the time range designated by the user operation and the cumulative time value of the magnitude of the voice in the time range. Accordingly, even if setting a display target having a long time range when assigning the color to the screen by converting cumulative time value $F_{r0,\tau}(i, j)$ of the magnitude of the voice into the RGB value, viewing device 30 can prevent that it is difficult to watch the screen by assigning the color to the entire screen. In addition, sound parameter display controller 442 may display voice heat map MP (sound source visual image) as color information based on an absolute value of cumulative time value F of the magnitude of the voice and the same effect as described above can be obtained.

Fourth Exemplary Embodiment

Since a system configuration of voice monitoring system 5 according to a fourth exemplary embodiment is the same as the system configuration of the voice monitoring system according to the first exemplary embodiment, repeated description will be simplified or omitted and different contents will be described.

In the fourth exemplary embodiment, in the same manner as the third exemplary embodiment, when converting cumulative time value $F_{r0,\tau}(i, j)$ of the magnitude of the voice in the pixel for each of predetermined units into the RGB value and assigning the color to the sound source visual image, as the time range designated by the user operation as a display target increases, viewing device 30 calculates the RGB value only for cumulative time value $F_{r0,\tau}(i, j)$ of the magnitude of the voice satisfying the predetermined condition.

Specifically, viewing device 30 uses the information of "how much time, a voice is detected" regardless of the time range designated by the user operation. Viewing device 30 assigns the color to the sound source visual image of the pixel corresponding to a case where the voice is detected for a certain time.

An RGB conversion operation in viewing device 30 according to the fourth exemplary embodiment is the same as that of the third embodiment, so description of the RGB conversion operation will be omitted. For example, even if cumulative time value F of the magnitude of the voice is equal to or larger than threshold value Vmin in the determination of step S21 in FIG. 11, in a case where the voice detection is not performed for a certain time as an absolute value, "NO" is determined and the RGB value is not calculated.

In this manner, in voice monitoring system 5 according to the fourth exemplary embodiment, viewing device 30 can display only the location at which the speech is performed for one minute or more in total, for example, even if setting a display target having a long time range when assigning the color to the screen by converting cumulative time value $F_{r0,\tau}(i, j)$ of the magnitude of the voice into the RGB value, viewing device 30 can prevent that it is difficult to watch the screen by assigning the color to the entire screen.

Fifth Exemplary Embodiment

Since a system configuration of voice monitoring system 5 according to a fifth exemplary embodiment is the same as the system configuration of the voice monitoring system according to the first exemplary embodiment, repeated description will be simplified or omitted and different contents will be described.

In the third and fourth exemplary embodiments, threshold value Vmin a fixed value (for example, a value smaller than "0.5") set in advance, but in the fifth exemplary embodiment, a case where the user can predetermine threshold value Vmin will be described.

Figure 12:
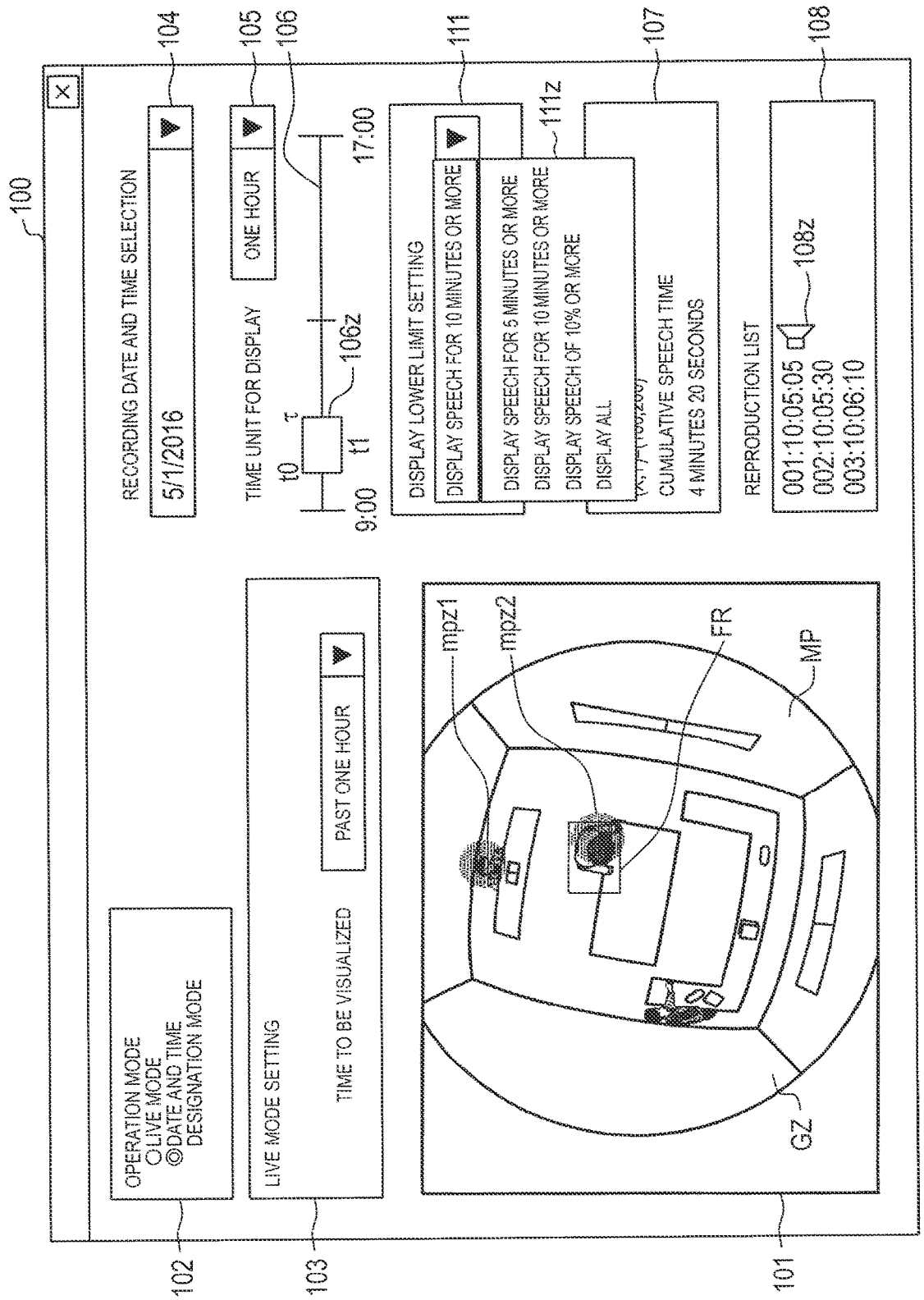
FIG. 12 is a diagram illustrating an example of a GUI displayed on a monitor according to a fifth exemplary embodiment.

FIG. 12 is a diagram illustrating an example of GUI 100 displayed on monitor 55 according to the fifth exemplary embodiment. The same component as GUI 100 according to the first exemplary embodiment is denoted by the same reference numeral and a detailed description thereof will be omitted. Display lower limit setting unit 111 is further provided in GUI 100. Display lower limit setting unit 111 includes pull-down menu 111z and a condition of threshold value Vmin for determining whether or not the sound source visual image is displayed on display screen 101 based on voice detection can be predetermined. Here, a plurality of items including "display speech for 5 minutes or more", "display speech for 10 minutes or more", "display speech of 10% or more", and "display all" are displayed in pull-down menu 111z and are selectable by the user. In FIG. 12, the item of "display speech for 10 minutes or more" is selected.

In display screen 101, voice heat map MP (that is, sound source visual image) generated by color information convertor 443 based on cumulative time value F of the magnitude of the voice calculated by sound parameter calculator 441 according to the condition of threshold value Vmin set by display lower limit setting unit 111 is displayed by being superimposed on captured image GZ.

In this manner, for example, by setting the items such as "display speech for 5 minutes or more" or "display speech of 10% or more of designated time", the user can intuitively recognize a relation between a method of assigning the color and a speech time on the display screen 101.

In voice monitoring system 5 according to the fifth exemplary embodiment, when displaying voice heat map MP with the RGB value based on cumulative time value F of the voice, viewing device 30 can receive the condition designated by the user operation for GUI 100. That is, by using GUI 100, since the user can predetermine the condition based on threshold value Vmin, operability and visibility of the user are improved.

Sixth Exemplary Embodiment

Since a system configuration of voice monitoring system 5 according to a sixth exemplary embodiment is the same as the system configuration of the voice monitoring system according to the first exemplary embodiment, repeated description will be simplified or omitted and different contents will be described.

In a case where a time rage is long such as one hour or one day when displaying the sound source visual image (voice heat map MP) on monitor 55 based on the sound parameter in the time range designated by the user by using image data and voice data recorded on recording device 70, it may take time for viewing device 30 to add or average all of the stored sound parameters for each of certain times.

In the sixth exemplary embodiment, even if the time range designated by the user operation is long, in order to reduce a processing time such as calculation of the sound parameters until the sound source visual image (voice heat map MP) is displayed, for example, in a case of storing the sound parameter at intervals of once per second, sound parameter storage unit 72 also calculates and stores a sound parameter obtained by adding or averaging the sound parameters for 60 seconds every 60 seconds (sound parameter of a section for 60 seconds as one section). In addition, sound parameter display controller 442 selects the read sound parameter in units of any one of 1 second or 60 seconds according to the time range designated by the user operation. Sound parameter calculator 71 calculates the sound parameter in selected units. Although 60 seconds are used as a unit of a fixed time, this value is merely an example and a predetermined time such as one hour, 24 hours, or the like may be used as the unit.

FIG. 13 is a diagram illustrating an example of a structure of a file storing a sound parameter in units of 60 seconds according to the sixth exemplary embodiment. The sound parameter in units of 60 seconds includes elements such as "60 sound parameters per second", "average value of sound parameters for the last 60 seconds", . . . in addition to the example of the structure of the file illustrated in FIG. 8 according to the first exemplary embodiment.

In addition to storing the sound parameter once per second, sound parameter storage unit 72 stores the sound parameter obtained by adding or averaging the sound parameters for 60 seconds every 60 seconds calculated by sound parameter calculator 71. Furthermore, sound parameter storage unit 72 stores the sound parameter obtained by adding or averaging the sound parameters for one hour every one hour calculated by sound parameter calculator 71.

In this manner, invoice monitoring system 5 according to the sixth exemplary embodiment, an interval (second interval) equal to or more than N (N is an integer equal to or greater than 2) times the interval (first interval) at which the sound parameter is calculated for each of certain times is set as one section and sound parameter calculators 71 and 441 calculates the sound parameter for the section. Sound parameter storage unit 72 stores the sound parameter for the same section.

For example, even in a case where the time range designated by the user is as long as 1 hour, sound parameter calculator 441 obtains the sound parameter by adding or averaging data for one hour by using data of "60 sound parameters per second" or "average value of sound parameters for the last 60 seconds", stored in sound parameter storage unit 72. Therefore, as the sound parameter for one hour, the calculation process is faster than adding 3600 sound parameters per second. In addition, it is possible to relatively easily calculate the sound parameter within the designated time range. Accordingly, it is possible to reduce the calculation time after the user designates the time range. Sound parameter storage unit 72 does not use a timing of writing to recording device 70 according to the above interval, but sound parameter storage unit 72 may temporarily store the sound parameters in a memory having a short writing time and then may combine the sound parameters to write the resultant sound parameter in a storage medium having a long writing time.

Seventh Exemplary Embodiment

Since a system configuration of voice monitoring system 5 according to a seventh exemplary embodiment is the same as the system configuration of the voice monitoring system according to the first exemplary embodiment, repeated description will be simplified or omitted and different contents will be described.

In the sixth exemplary embodiment, in a case of storing the sound parameter once per second, sound parameter storage unit 72 stores the sound parameter obtained by adding or averaging the sound parameters for 60 seconds every 60 seconds. In addition, sound parameter storage unit 72 stores the sound parameter obtained by adding or averaging the sound parameters for one hour every one hour.

In the seventh exemplary embodiment, for example, sound parameter calculator 441 calculates in advance the sound parameter read according to the designated time range in units of at least three of 1 second (short period) which is a first interval, 60 seconds (medium period) which is a second interval, and one hour (long period) which is a third interval. Sound parameter storage unit 72 stores the sound parameter of the calculated three or more time units.

In this manner, in voice monitoring system 5 according to the seventh exemplary embodiment, in the same manner as the sixth exemplary embodiment, viewing device 30 uses a storage result of an appropriate (for example, calculated in the same unit as the time unit in the time range) sound parameter among the sound parameters calculated in three or more time units and stored according to the time range designated by the user, so that it is possible to reduce the calculation time after the user designates the time range. The sound parameters may be added and stored every 24 hours and every 12 hours. Furthermore, the sound parameters may be added and stored every one hour, every 10 minutes, and every 1 minute.

Eighth Exemplary Embodiment

Since a system configuration of voice monitoring system 5 according to an eighth exemplary embodiment is the same as the system configuration of the voice monitoring system according to the first exemplary embodiment, repeated description will be simplified or omitted and different contents will be described.

If an interval at which the sound parameters are stored in recorder R2 of recording device 70 is short when displaying the sound source visual image (voice heat map MP) on monitor 55 based on the sound parameter in the time range designated by the user by using image data and voice data recorded on recording device 70, viewing device 30 increases the amount of data to be written per second. For this reason, a memory area of recorder R2 is pressed. On the other hand, according to the user, in a case where it is desired to watch voice heat map MP within the designated time range after the data of the sound parameter is recorded in recorder R2, in some cases, the user wants to see voice heat map MP at intervals of one second or shorter.

In the eighth exemplary embodiment, sound parameter storage unit 72 stores the sound parameter to be stored at intervals of, for example, 1 second or more (5 seconds or the like). At the time of reproduction, according to the time range designated by the user operation, determining unit 46 of viewing device determines whether to refer to the sound parameter stored in sound parameter storage unit 72 or to calculate the sound parameter from the sound data recorded in recorder R1.

Figure 14:
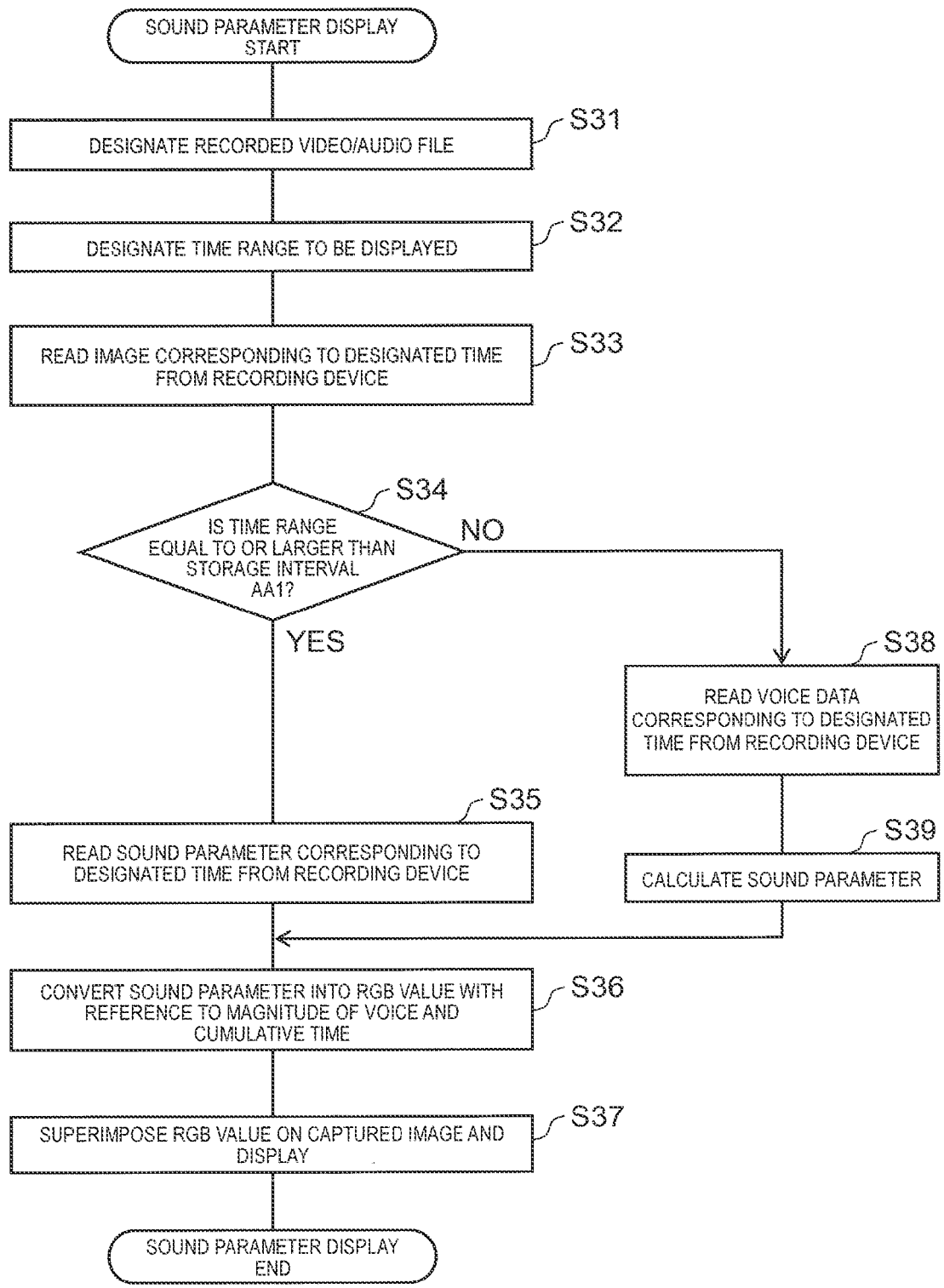
FIG. 14 is a flowchart for explaining in detail an example of an operation procedure of displaying a sound parameter according to an eighth exemplary embodiment.

FIG. 14 is a flowchart for explaining in detail an example of an operation procedure of displaying a sound parameter according to the eighth exemplary embodiment. The processes in steps S31 to S33 are the same as the processes in steps S11 to S13 in the first exemplary embodiment, so description thereof will be omitted.

Determining unit 46 determines whether or not the time range (in other words, time range designated by the user operation) within which the sound source visual image (voice heat map MP) is displayed is equal to or larger than an interval AA1 (storage interval, for example, 5 seconds) at which the sound parameter is stored (S34). In a case where the time range to be displayed is equal to or larger than the storage interval AA1 (YES in S34), the processes in steps S35, S36, and S37 are performed in the same manner as in steps S14, S15, and S16 in the first exemplary embodiment. That is, sound parameter calculator 441 reads a sound parameter corresponding to the time range designated in step S32 from recorder R2 (S35). Based on the read sound parameter, color information convertor 443 converts cumulative time value F of the magnitude of the voice into RGB values according to Equations (2) to (4) (S36).

Sound parameter display controller 442 generates a composite image by superimposing the sound source visual image (voice heat map MP) based the RGB value converted in step S36 on captured image GZ captured by omnidirectional camera CA and causes monitor 55 to display the resultant image (S37). After then, sound parameter display controller 442 terminates the present operation.

On the other hand, in step S34, in a case where the time range to be displayed is smaller than storage interval AA1 (NO in S34), for example, in a case where the time range (in other words, the time range designated by the user operation) within which the sound source visual image (voice heat map MP) is displayed is one second, the sound parameters at 5 second intervals stored in recorder R2 are not used. Sound parameter calculator 441 reads the original voice data stored in recorder R1 (S38) and, for example, calculates the sound parameters at one second intervals (S39). After then, the process of sound parameter calculator 441 moves to step S36.

In this manner, in voice monitoring system 5 according to the eighth exemplary embodiment, in a case of displaying voice heat map MP (the sound source visual image) on monitor 55, sound parameter display controller 442 selects whether to use the sound parameter stored in sound parameter storage unit 72 or to calculate the sound parameter based on the sound data recorded in recorder R1 and use the sound parameter, according to the time range designated by the user operation.

Accordingly, sound parameter storage unit 72 can store the sound parameter to be stored in recorder R2 at storage interval AA1 (for example, 5 seconds or more) longer than the displayed time range. Therefore, it is possible to provide a system capable of displaying the sound parameters in real time without increasing the amount of calculation at the time of reproduction, except in a case where the sound parameter is recalculated by using the original voice data while suppressing the amount of data to be stored in recorder R2. On the other hand, in a case where the user wants to see the voice heat map MP (the sound source visual image) within the time range of an interval shorter than storage interval AA1, based on the sound data recorded in recorder R1, sound parameter calculator 441 can calculate and store the sound parameter at storage intervals (for example, one second) shorter than the time range (for example, three seconds) of the interval shorter than storage interval AA1. Accordingly, even in a case where a time range shorter than storage interval AA1 is designated, the user can recognize voice heat map MP (the sound source visual image) superimposed on captured image GZ and convenience of the user is improved.

Ninth Exemplary Embodiment

Since a system configuration of voice monitoring system 5 according to a ninth exemplary embodiment is the same as the system configuration of the voice monitoring system according to the first exemplary embodiment, repeated description will be simplified or omitted and different contents will be described.

For example, in a case where a person speaks in a shop, there is a possibility that viewing device 30 superimposes a voice reflected by a wall or an obstacle in the store as a sound source visual image (voice heat map MP) based on the voice detection on captured image GZ and displays the resultant image. In the ninth exemplary embodiment, area designation unit 451 as an exclusion area setting unit sets coordinates information of an area designated by the user operation as a collected sound exclusion area for invalidating the sound collected by microphone array MA.

Figure 15:
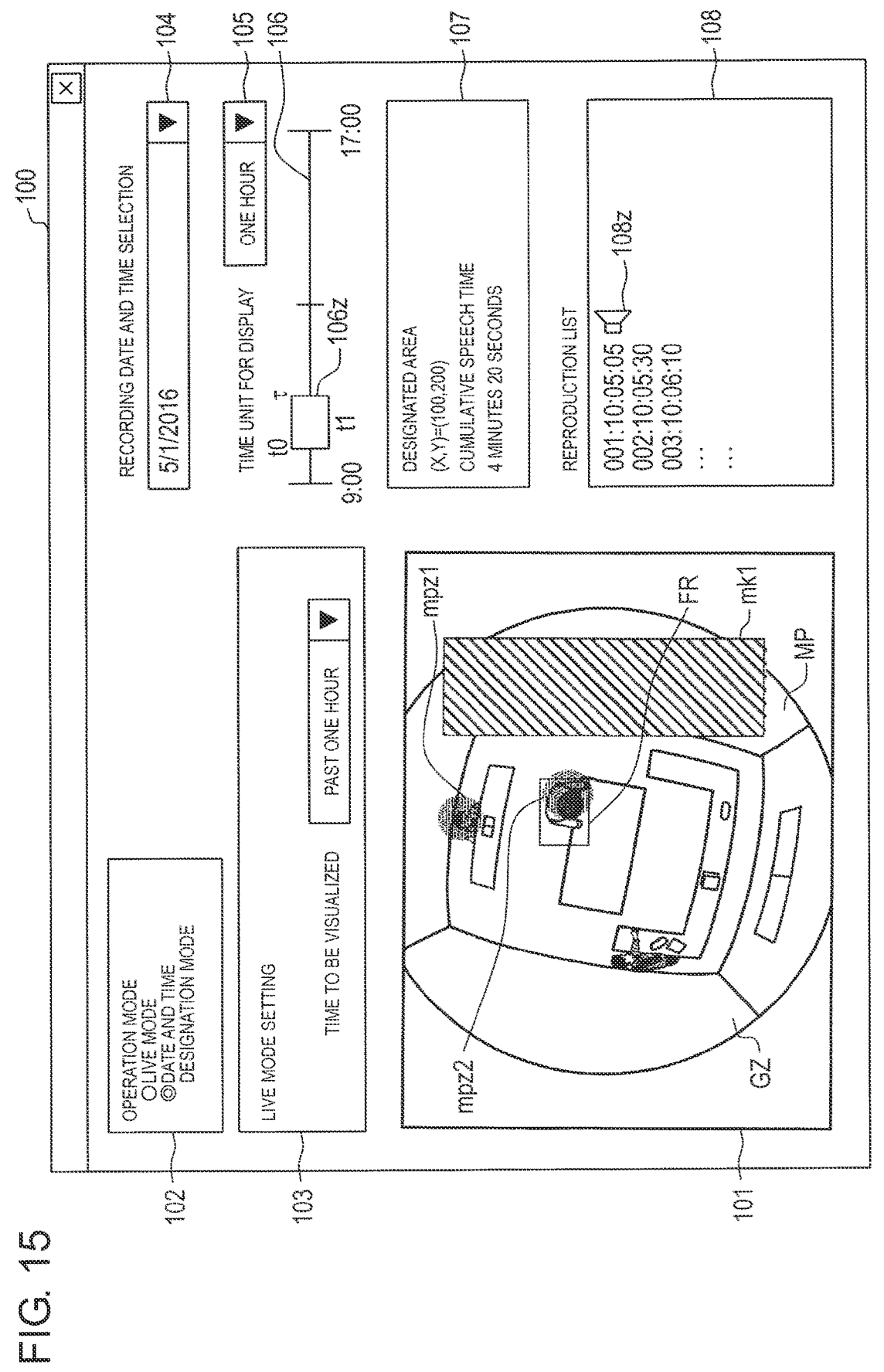

FIG. 15 is a diagram illustrating an example of GUI 100 displayed on monitor 55 according to the ninth exemplary embodiment. In GUI 100, collected sound exclusion area mk1 is displayed on display screen 101. Coordinates information of collected sound exclusion area mk1 on captured image GZ may be recorded in association with data of captured image GZ of recorder R1, for example, or may be stored in association with each other data of captured image GZ in memory 43 of viewing device 30. When calculating the sound parameter, sound parameter calculators 71 and 441 determine whether or not coordinates indicating a position of the sound source at which a voice is detected is registered as collected sound exclusion area mk1 and in a case where the coordinates are registered, sound parameter calculators 71 and 441 set an output of the sound parameter to a value of 0.

In this manner, in voice monitoring system 5 according to the ninth exemplary embodiment, viewing device 30 sets collected sound exclusion area mk1 (exclusion area) in which the sound collected by microphone array MA is excluded from a collection target. Sound parameter calculators 71 and 441 calculate the sound parameter by suppressing the voice from set collected sound exclusion area mk1. Accordingly, it is possible to prevent a result of the voice detection due to a speech or the like from being displayed in a location of the wall or the obstacle in which the speech is not obviously performed. Instead of outputting the voice from collected sound exclusion area mk1 as the value of 0, sound parameter calculators 71 and 441 may reduce and output the voice.

Tenth Exemplary Embodiment

Since a system configuration of voice monitoring system 5 according to a tenth exemplary embodiment is the same as the system configuration of the voice monitoring system according to the first exemplary embodiment, repeated description will be simplified or omitted and different contents will be described.

In voice monitoring system 5 according to the tenth exemplary embodiment, viewing device 30 can emphasize an actual voice around the sound source on captured image GZ designated by the user operation based on information in which the sound source is specifically visualized by the sound source visual image (voice heat map MP) can output the voice. As described above, directional sound data generator 42 emphasizes the voice in a direction from microphone array MA toward a position of the sound source designated by the user operation, for the sound collected by microphone array MA and forms directivity of the voice. This technology is also called a beamformer technology. Therefore, viewing device 30 can form the voice having directivity at a location corresponding to a position designated by the user by storing the voice collected by each of the microphones mounted on microphone array MA in recording device 70 and by performing a signal process on the recorded voice at the time of reproduction desired by the user.

In addition, if many items of the voice detection period in a short time are placed in reproduction list 108 of GUI 100, the number of labels (the number of items) increases and visibility deteriorates. In the tenth exemplary embodiment, a voice for a period shorter than a certain period is ignored. In addition, in a case where a time (a voice detection interval) from voice detection until the next voice detection is short, the voice sections are combined. For example, intervals equal to or longer than N (N is an integer equal to or greater than 2) times among the voice detection intervals are combined as one section. N times is 10 times as an example.

In addition, sound parameter calculator 71 (or sound parameter calculator 441) calculates a sound parameter within a section by averaging or adding times of the sound parameters within the combined section. Sound parameter storage unit 72 stores the sound parameter within the calculated section. Accordingly, it is possible to suppress a time taken to calculate the sound parameter.

In addition, although the voice detection interval is an interval which is N times (for example, 10 times) or longer as a section within which the sound parameters are combined, the section may include at least three of a short period, a medium period, and a long period. For example, it is possible to store data in units of one minute, 10 minutes, one hour, and one day and to set an appropriate section according to a situation such as a conversation or the like.

Figure 16:
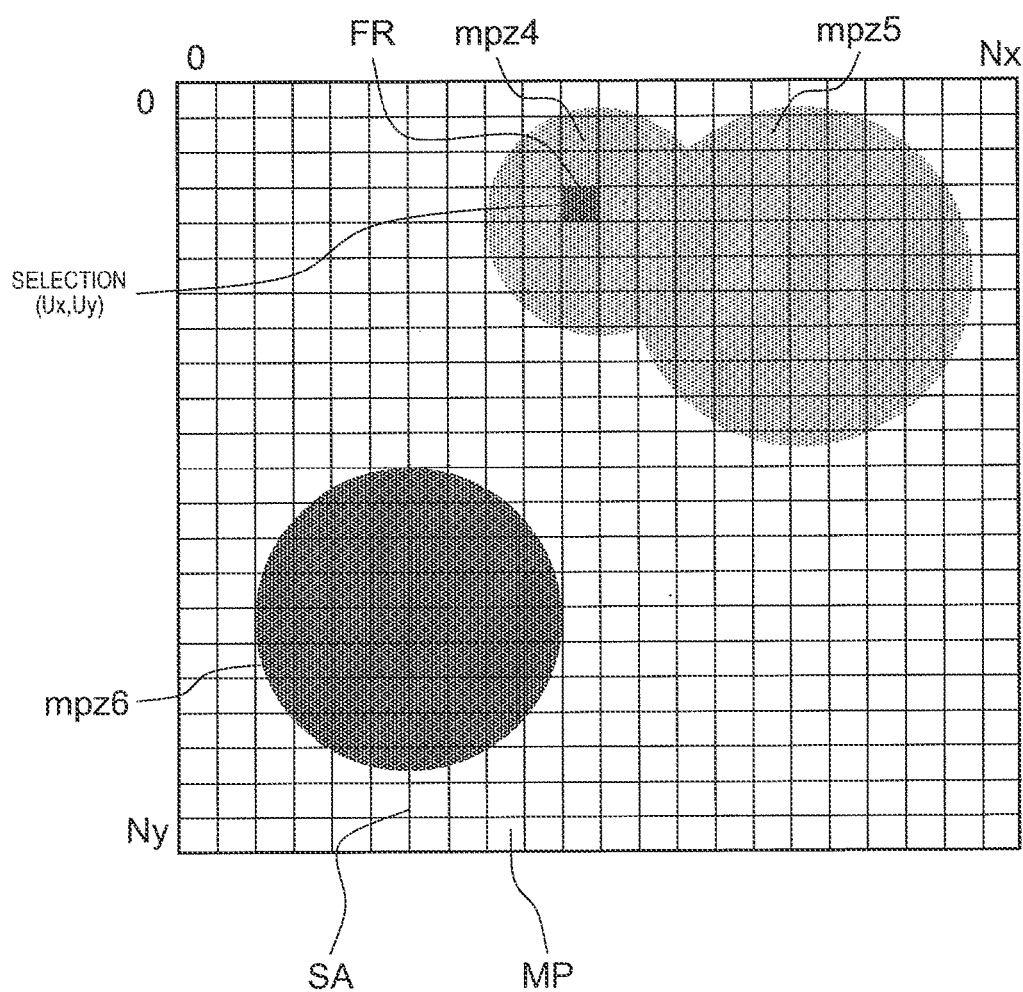
FIG. 16 is a diagram illustrating an example of an area in which a detected voice is large in a monitoring area according to a tenth exemplary embodiment.

FIG. 16 is a diagram illustrating an example of areas mpz4, mpz5, and mpz6 in which detected voices are large in monitoring area SA according to the tenth exemplary embodiment. A case where the time range designated by the user operation is 10:00 to 10:30 and coordinates (Ux, Uy) of designated area FR are set to area mpz4 in which a voice is large. Here, coordinates (X, Y) designated by the user are expressed as coordinates (Ux, Uy).

Figures 17A, 17B:
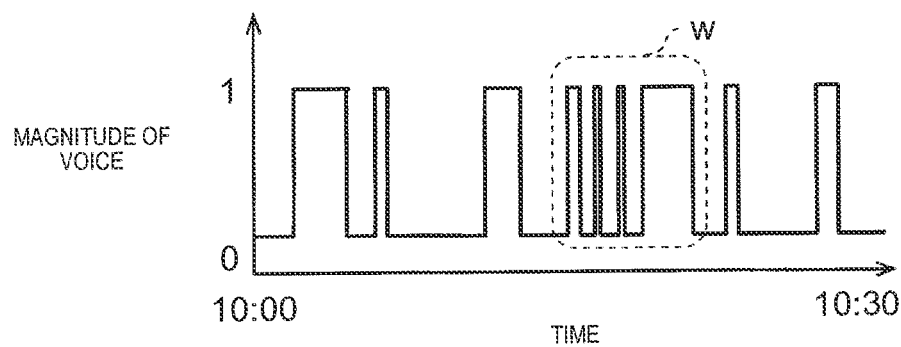
FIG. 17A is a graph illustrating a time change (presence or absence of a voice) of voice detection at coordinates (Ux, Uy) of designated area FR within a designated time range (10:00 to 10:30).
FIG. 17B is a diagram illustrating an example of a reproduction list of a voice for a voice detection period detected in FIG. 17A.

FIGS. 17A and 17B are diagrams for explaining a status of voice detection at coordinates (Ux, Uy) of designated area FR within a designated time range. FIG. 17A is a graph illustrating the presence or absence of a voice (time change of voice detection) within a time range of 10:00 to 10:30. FIG. 17B is a diagram illustrating reproduction list 108 corresponding to FIG. 17A. In reproduction list 108, label number 001 has a voice detection period of "10:02 to 10:03". It is assumed that a voice for the voice detection period is detected in, for example, area mpz6 in which the voice is large. In addition, label number 002 has a voice detection period of "10:05". A voice for the voice detection period is included in reproduction list 108, but the voice has a voice time less than one second. Since in the present exemplary embodiment, the voice is ignored, a voice visual image indicating the area in which the voice is large is not generated.

In addition, label number 003 has a voice detection period of "10:10 to 10:11". It is assumed that a voice for the voice detection period is detected in, for example, area mpz4 in which the voice is large. Label number 004 has a voice detection period of "10:14 to 10:20". It is assumed that a voice for the voice detection period is a voice obtained by combining voices having short voice detection intervals (see reference numeral w in FIG. 17A) and is detected in, for example, area mpz5 in which the voice is large. Here, the four voice detection periods are combined into one.

In addition, label number 005 has a voice detection period of "10:22". A voice for the voice detection period has a voice time less than one second. Since in the present exemplary embodiment, the voice is ignored, a voice visual image indicating the area in which the voice is large is not generated. Finally, label number 006 has a voice detection period of "10:28". Since a voice for the voice detection period is handled in the same manner as the voice detection period of label number 005, the same description will be omitted.

Figure 18:
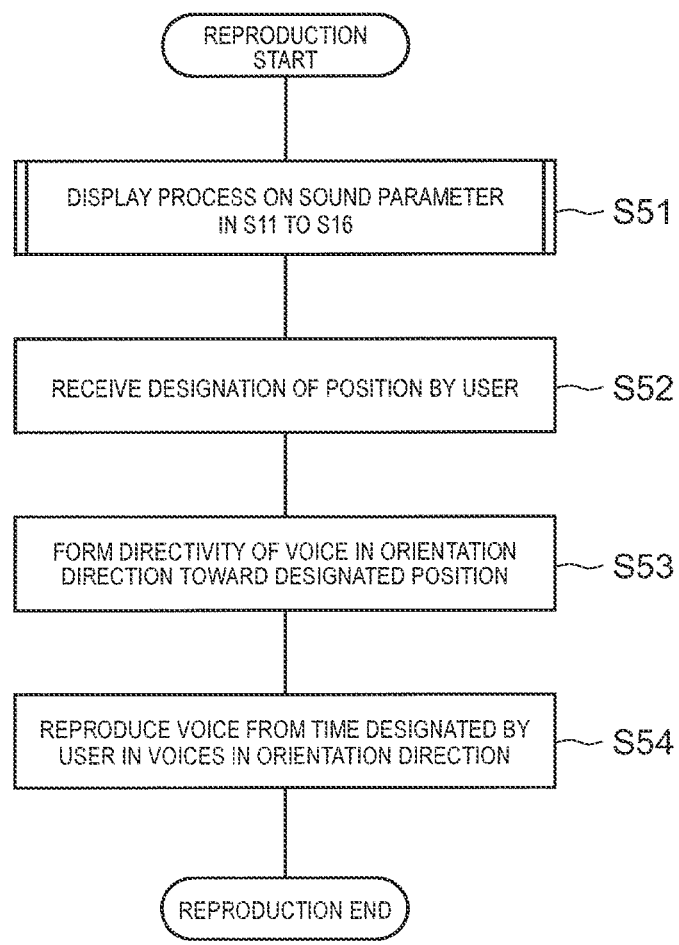
FIG. 18 is a flowchart for explaining in detail an example of each of operation procedures of a voice emphasis process and voice reproduction according to the tenth exemplary embodiment.

FIG. 18 is a flowchart for explaining in detail an example of each of operation procedures of a voice emphasis process and voice reproduction according to the tenth exemplary embodiment. Reproduction control device 40 performs a display process on the sound parameter obtained by superimposing voice heat map MP on captured image GZ (S51). The process in step S51 is the same as the processes in steps S11 to S16 in the first exemplary embodiment, so description thereof will be omitted. The process of step S51 may be the process illustrated in the flowchart in FIG. 14 according to the eighth exemplary embodiment.

Area designation unit 451 receives designation of a position to be reproduced in captured image GZ by the user via operation unit 58 (S52). The designation of the position to be reproduced is performed by the user moving designated area FR.

Directional sound data generator 42 emphasizes (forms directivity of the voice in the orientation direction) the voice in an orientation toward a position designated by the user operation, from microphone array MA (S53). Reproduction controller 41 reproduces a voice from the first within the time range designated by the user, among the voices in the orientation direction in which directivity is formed (S54). After reproducing the voice, reproduction control device 40 terminates the present operation.

In this manner, in voice monitoring system 5 according to the tenth exemplary embodiment, operation unit 58 receives an operation for designating a position of voice heat map MP (the sound source visual image) displayed on monitor 55. Directional sound data generator 42 forms directivity of the voice collected by microphone array MA by setting the designated position of voice heat map MP as an orientation direction and generates sound data in the orientation direction. Reproduction controller 41 reproduces a voice of the voice data in the orientation direction and causes speaker 50 to output the voice.

In this manner, by predetermining the position on display screen 101 disposed in GUI 100, for example, by designating the area in which a voice is large for voice heat map MP displayed within the time range designated by the user operation, the user can listen to contents of a desired voice. Reproduction control device 40 may present a plurality of areas, in which voices are large, included in the voice visualized image calculated by using information of the sound parameter to the user so as to give options. In addition, by combining the voices having the short voice detection intervals, it possible to listen to related voices among conversations without omission, for example. In addition, it is possible to suppress a time taken to calculate the sound parameter.

Eleventh Exemplary Embodiment

Since a system configuration of voice monitoring system 5 according to an eleventh exemplary embodiment is the same as the system configuration of the voice monitoring system according to the first exemplary embodiment, repeated description will be simplified or omitted and different contents will be described.

In a case of reproducing the voice in the time range designated by the user operation, since which time zone in the time range a voice exists is not known, even if reproduction controller 41 reproduces the voice from the first in the designated time range, the user may not hear any voice for a while. In addition, for example, since the voice visual image visualized on display screen 101 is changed as a time elapses by a person moving or the like and coordinates of the area in which a voice is large also deviates (displace), in some cases, it is difficult for the user to accurately designate the position of the sound source while watching the display screen.

In voice monitoring system 5 according to the eleventh exemplary embodiment, sound parameter display controller 442 reads the sound parameter from recording device 70 and calculates cumulative time value F of the magnitude of the voice in the designated time range, and together stores time information at which voice detection is performed. At the time of reproduction, reproduction controller 41 adds the time information, at which the voice detection is performed, as an offset to the designated time range and reproduces the voice. Accordingly, if the reproduction is started, the user can immediately listen to the voice.

In addition, when the user designates coordinates of the area, in which a voice is large, displayed on the display screen, area designation unit 451 designates the coordinates by correcting the coordinates into coordinates having the largest voice in the designated area of surrounding N cm (M pixels) or the time when the voice is detected is the longest. Accordingly, the user can accurately designate the position (the orientation direction of the voice) of the sound source. In addition, viewing device 30 can more clearly reproduce the voice after applying the beamformer technology.

Figure 19:
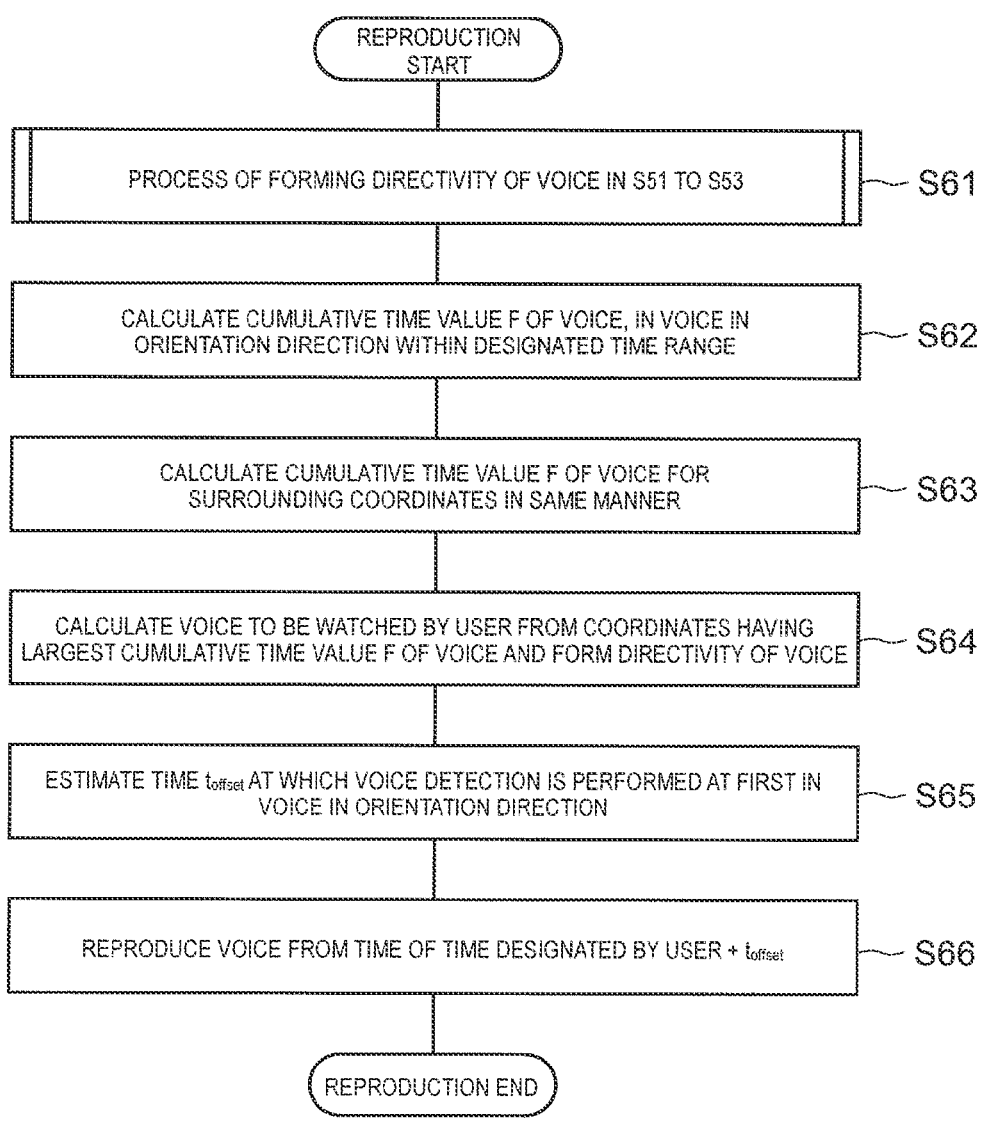
FIG. 19 is a flowchart for explaining in detail an example of each of operation procedures of a voice emphasis process and voice reproduction according to an eleventh exemplary embodiment.

FIG. 19 is a flowchart for explaining in detail an example of each of operation procedures of a voice emphasis process and voice reproduction according to the eleventh exemplary embodiment. The process in the same step as the process in the step illustrated in the flowchart in FIG. 18 according to the tenth exemplary embodiment is denoted by the same step number, and description thereof will be omitted.

Figure 20:
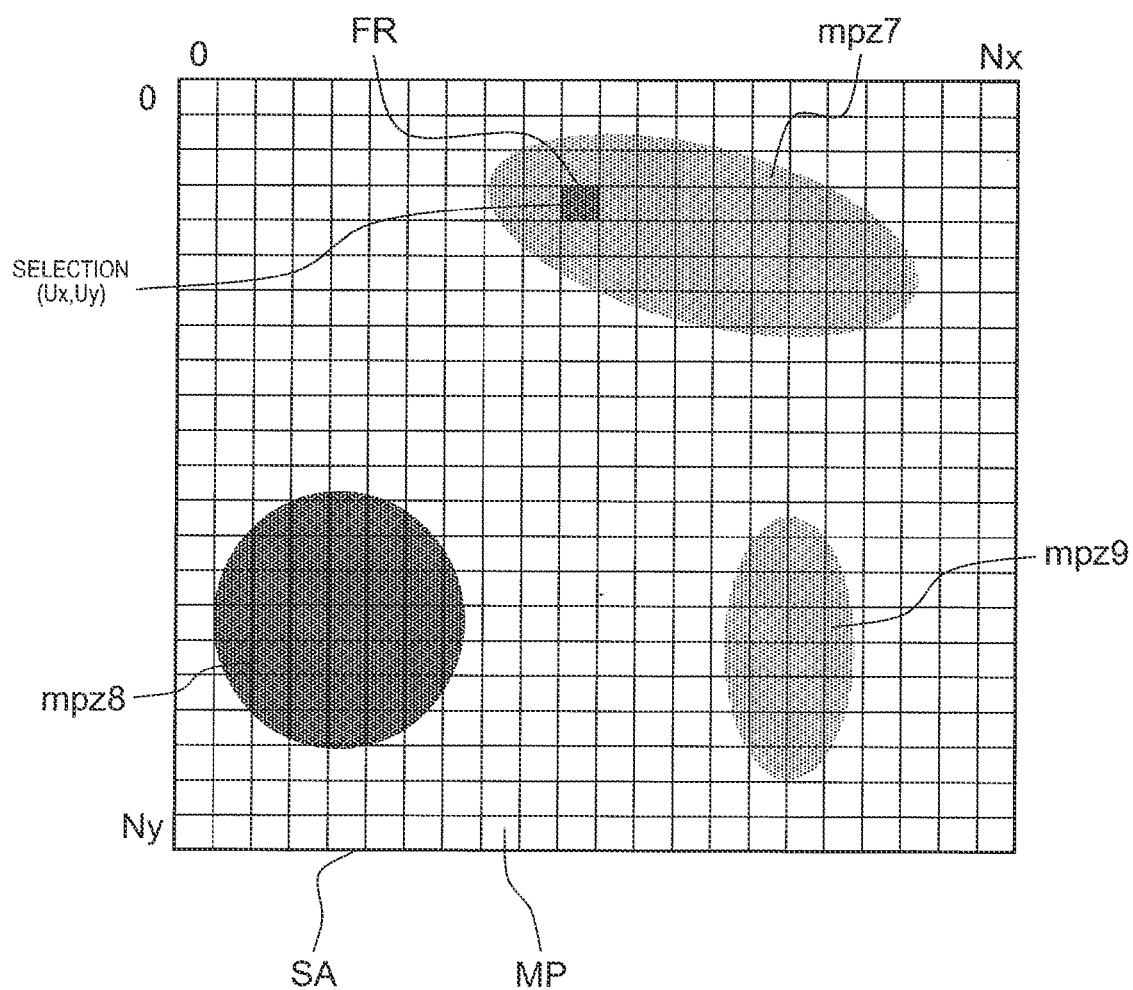
FIG. 20 is a diagram illustrating an example of coordinates (Ux, Uy) of a designated area selected from a monitoring area by a user.

Sound parameter calculator 441 performs the same processes as steps S51 to S53 in the tenth exemplary embodiment (S61). FIG. 20 is a diagram illustrating an example of coordinates (Ux, Uy) of designated area FR selected from monitoring area SA by the user. Designated area FR is selected from areas mpz7, mpz8, and mpz9 in which voices are large.

Figure 21:
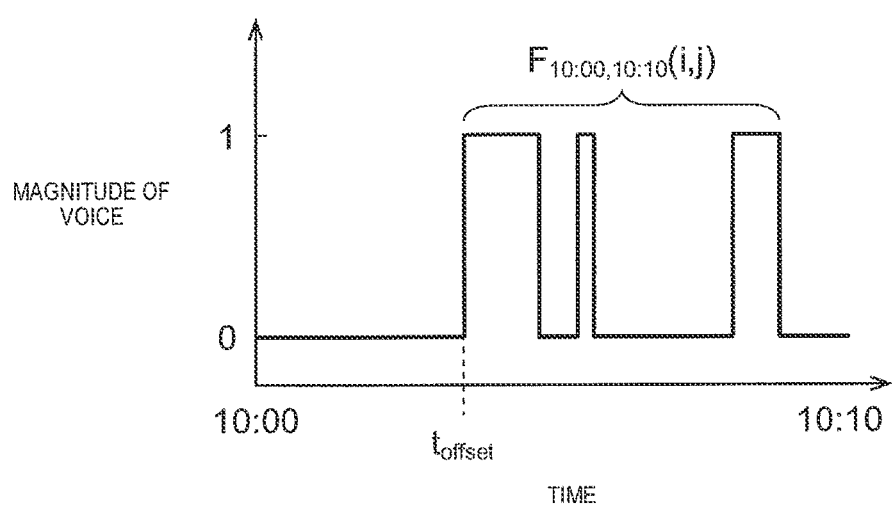
FIG. 21 is a graph illustrating an example of a time change of voice detection at coordinates (Ux, Uy) of the designated area.

FIG. 21 is a graph illustrating an example of a time change of voice detection at coordinates (Ux, Uy) of designated area FR. In FIG. 21, the user designates "10:00 to 10:10" to the time range. In the time range, a speech period appears irregularly beside a silent period.

In the time range designated by the user, sound parameter calculator 441 calculates cumulative time value F of the magnitude of the voice from the voices in directions in which directivity is formed in step S61 according to Equation (1) (S62). Sound parameter calculator 441 calculates cumulative time value F of the magnitude of the voice for surrounding coordinates of the coordinates designated by the user, in the same manner according to Equation (1) (S63).

Directional sound data generator 42 calculates a voice to be watched by the user from coordinates having largest cumulative time value F of the magnitude of the voice among cumulative time values F of the magnitude of the voice calculated in steps S62 and S63 and forms directivity of the voice by setting a direction from microphone array MA toward the sound source corresponding to the coordinates as an orientation direction (S64). In the voice in the orientation direction, of which directivity is formed in step S64, reproduction controller 41 estimates offset time $t_{offset}$ until voice detection is performed at first (S65). In FIG. 21, as described above, "10:00 to 10:10" is set to the time range. In addition, offset time $t_{offset}$ is approximately "10:04", and a speech period starts from this timing.

Reproduction controller 41 reproduces the voice, in which directivity is formed (emphasized), from a time obtained by adding offset time $t_{offset}$ to a first time in the time range designated by the user, that is, "10:00+$t_{offset}$" (S66). After then, reproduction control device 40 terminates the present operation. Instead of reproducing the voice in which directivity is formed (emphasized) immediately after the period of "10:00+$t_{offset}$", reproduction controller 41 may reproduce the voice from a predetermined time (for example, several seconds) before "10:00+$t_{offset}$".

In this manner, in voice monitoring system 5 according to the eleventh exemplary embodiment, reproduction controller 41 reproduces the sound collected by microphone array MA from the voice detection period (the speech period) when the voice is detected within the designated time range. Accordingly, if the user designates a position and a time range which the user wants to hear while watching the voice visualized image being superimposed on the captured image and displayed, the user can listen to the voice as soon as the reproduction is started.

Twelfth Exemplary Embodiment

Since a system configuration of voice monitoring system 5 according to a twelfth exemplary embodiment is the same as the system configuration of the voice monitoring system according to the first exemplary embodiment, repeated description will be simplified or omitted and different contents will be described.

If the time range designated by the user is long, in some cases, it may be difficult to recognize how much voices are output in which time zone by using only the voice visualized image (the color information) superimposed on the captured image. In the twelfth exemplary embodiment, when sound parameter display controller 442 reads the sound parameter from recording device 70 and calculates cumulative time value F of the magnitude of the voice in the designated time range, sound parameter display controller 442 together stores time information at which voice detection is performed.

In addition, when the user designates a position, which the user wants to reproduce, on captured image GZ, sound parameter display controller 442 refers to sound parameter storage unit 72. In a case where a plurality of voice detection sections are detected, sound parameter display controller 442 (for example, reproduction list 108) lists up items (for example, time zone, see FIG. 5) of information related to the sound parameter corresponding to the designated position (that is, coordinates on captured image GZ) to a list (for example, reproduction list 108) according to the time information in which the voice is detected. At this time, as described in the eleventh exemplary embodiment, the user may correct the position (coordinates) designated by the user.

In addition, when the user selects the listed item of the information related to the sound parameter, the time information described in the item is added to the designated time range as an offset and the voice is played. Accordingly, if the reproduction is started, the user can immediately listen to the voice.

Figure 22:
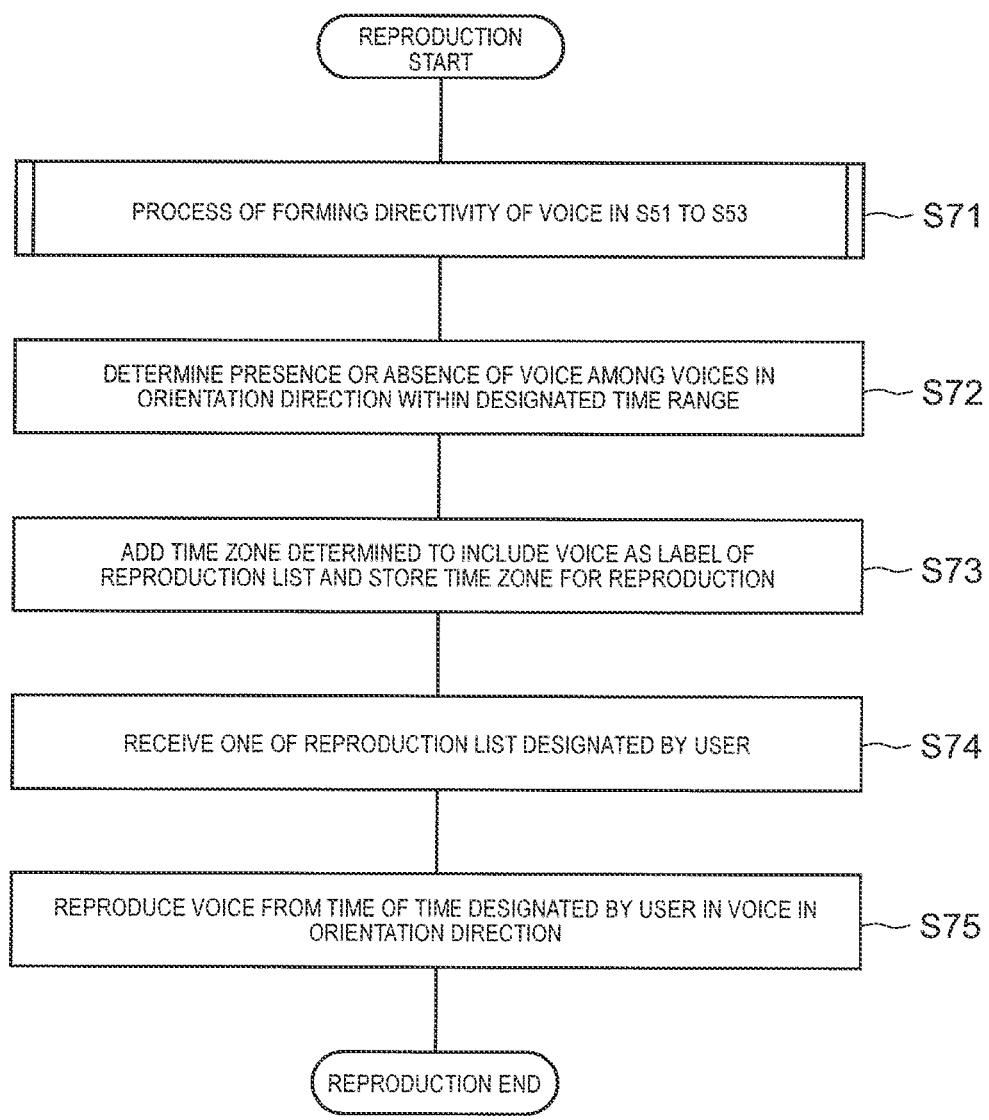
FIG. 22 is a flowchart for explaining in detail an example of each of operation procedures of a voice emphasis process and voice reproduction according to a twelfth exemplary embodiment.

FIG. 22 is a flowchart for explaining in detail an example of each of operation procedures of a voice emphasis process and voice reproduction according to the twelfth exemplary embodiment. The process in the same step as the process in the step illustrated in the flowchart in FIG. 18 according to the tenth exemplary embodiment is denoted by the same step number, and description thereof will be omitted.

Sound parameter calculator 441 performs the processes as steps S51 to S53 in the tenth exemplary embodiment which are the same process as step S61 in the eleventh exemplary embodiment (S71). Sound parameter calculator 441 determines the presence or absence of a voice in the orientation direction described above within the time range designated by the user (S72).

Sound parameter calculator 441 adds a time zone, in which it is determined that the voice exists, as a label of reproduction list 108 (S73). In addition, sound parameter calculator 441 stores the time zone in memory 43 for reproduction. Reproduction controller 41 receives one in reproduction list 108 designated by the user via operation unit 58 (S74).

In the same manner as the process in step S54, reproduction controller 41 reproduces the voice from the first in designated one time zone of reproduction list 108 within the time range designated by the user, among the voices in which the orientation direction is formed (S74). After reproducing the voice, reproduction control device 40 terminates the present operation.

In this manner, in voice monitoring system 5 according to the twelfth exemplary embodiment, reproduction controller 41 displays a reproduction list (a list of voice detection periods) within the designated time range and reproduces the voice for the voice detection period selected from the reproduction list.

Accordingly, if the user designates a position of designated area FR of which voice information is desired to be obtained by the user, sound parameter display controller 442 lists up the items of the information related to the sound parameter corresponding to the coordinates among the sound parameters to reproduction list 108 according to the time information in which the voice is detected. In this manner, by selecting an item listed in the reproduction list, the user can listen to the desired voice even in a case where the time range designated by the user is long.

Thirteenth Exemplary Embodiment

Since a system configuration of voice monitoring system 5 according to a thirteenth exemplary embodiment is the same as the system configuration of the voice monitoring system according to the first exemplary embodiment, repeated description will be simplified or omitted and different contents will be described.

When superimposing the sound source visual image (voice heat map MP) based on the voice detection within the time range designated by the user operation, instead of captured image GZ which is a background, it is considered that a video for the voice detection period is displayed. In this case, the video may be simply reproduced from the first in the designated time range, but a relation between the sound source visual image (voice heat map MP) and the video becomes difficult to understand. In the thirteenth exemplary embodiment, viewing device 30 extracts one image frame of a captured image from not the video but a plurality of image frames constituting the video and uses the image frame, so that it is easy to understand the relation between the sound source visual image (voice heat map MP) and the captured image which is a background.

Figure 23:
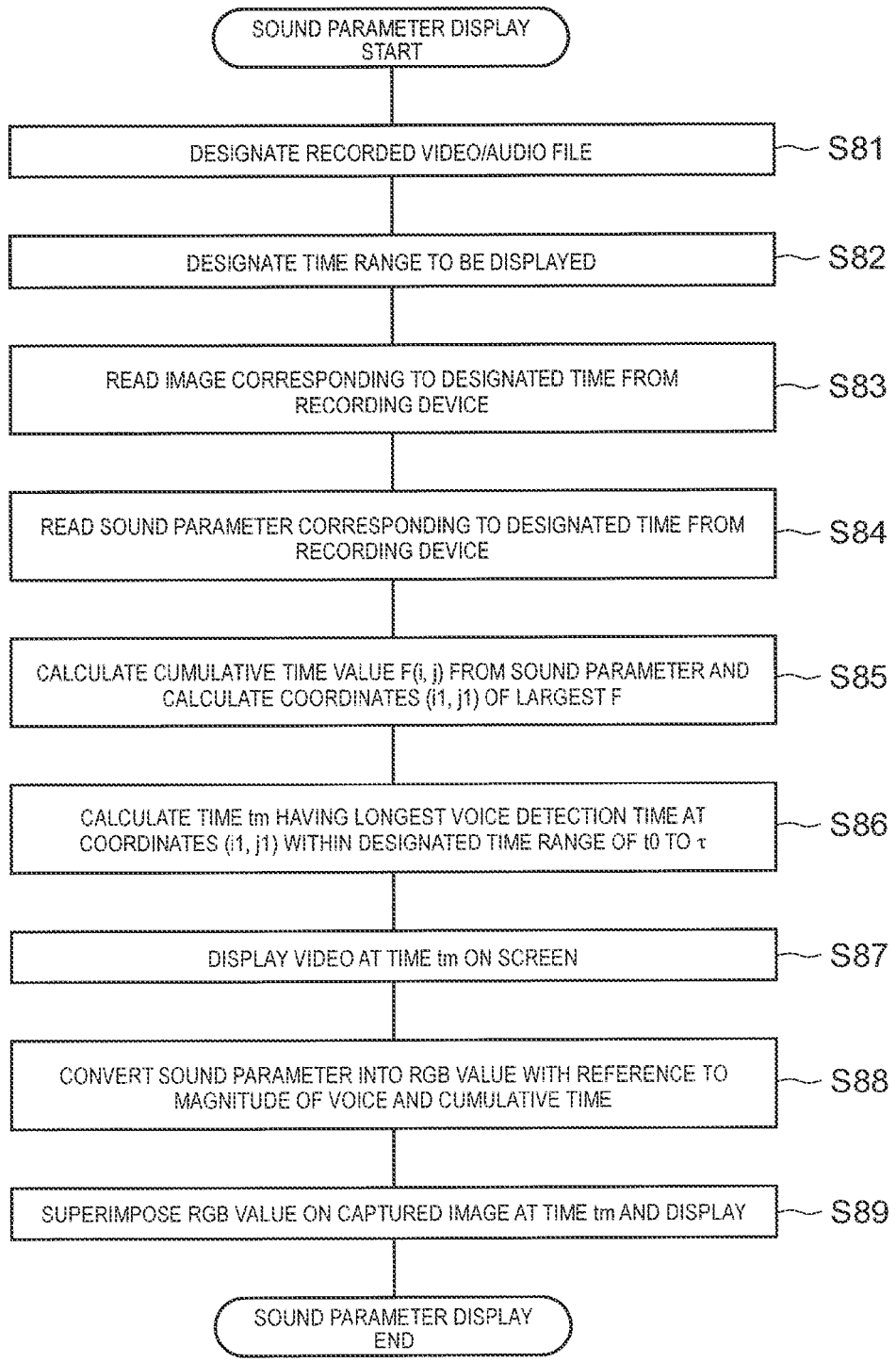
FIG. 23 is a flowchart for explaining in detail an example of an operation procedure of displaying a sound parameter according to a thirteenth exemplary embodiment.

FIG. 23 is a flowchart for explaining in detail an example of an operation procedure of displaying a sound parameter according to the thirteenth exemplary embodiment. The processes in steps S81 to S84 are the same as the processes in steps S11 to S14 in the first exemplary embodiment, so description thereof will be omitted.

Sound parameter calculator 441 calculates cumulative time values F(i, j) of the magnitude of the voice at coordinates (i, j) on the captured image and calculates the maximum cumulative time value $F(i_1, j_1)$ of the magnitude of the voice among calculates cumulative time values F(i, j) (S85). Furthermore, sound parameter calculator 441 calculates time tm having the longest voice detection time within the designated time range (that is, display start time t0 to display end time (t0+τ)) among coordinates $(i_1, j_1)$ (S86). Reproduction controller 41 extracts an image frame at time tm from the images (the video) recorded in recorder R1 in the designated time range (that is, display start time t0 to display end time (t0+τ)) and displays the image on the screen of monitor 55 (S87).

In the same manner as step S15 in the first exemplary embodiment, based on the read sound parameter, color information convertor 443 converts cumulative time value F of the magnitude of the voice into RGB values (S88). Sound parameter display controller 442 generates a composite image by superimposing the sound source visual image (voice heat map MP) based the RGB value converted in step S88 on the image frame of time tm and causes monitor 55 to display the resultant image (S89). After then, reproduction control device 40 terminates the present operation.

In this manner, in voice monitoring system 5 according to the thirteenth exemplary embodiment, viewing device 30 obtains the time zone having the longest the voice detection period in the time range designated by the user operation. Reproduction controller 41 displays the captured image of monitoring area SA of a scene included in the time zone on which voice heat map MP is superimposed, on the monitor 55. In this manner, by displaying the video (captured image) most related to the sound source visual image (voice heat map MP) like one image, it is easy to understand the relation between the sound source visual image (voice heat map MP) and the video. Therefore, the user can easily recognize the sound source in the video displayed on monitor 55.

Fourteenth Exemplary Embodiment

In a case where the time range designated by the user operation is a long time or a case where an actual voice is reproduced, even if viewing device reproduces sound data in the time range, it is not always possible to reproduce a voice portion in an early stage and the user may have to wait until the voice portion is reproduced.

In a fourteenth exemplary embodiment, if a time range is designated by the user operation, viewing device 30 reads sound data in the time range from recorder R1, analyzes the sound data, and displays an analysis result (for example, speech contents and speech tendency) on monitor 55 so as to be able for the user to intuitively and visually determine a voice detection period. In addition, viewing device 30 displays the speech contents of the analysis result as a speech bubble. Accordingly, the user can simply designate a voice which the user wants to reproduce while watching monitor 55 and can listen to a portion of the voice in an early stage (that is, stress-free) without waiting until the voice portion is reproduced.

Figure 24:
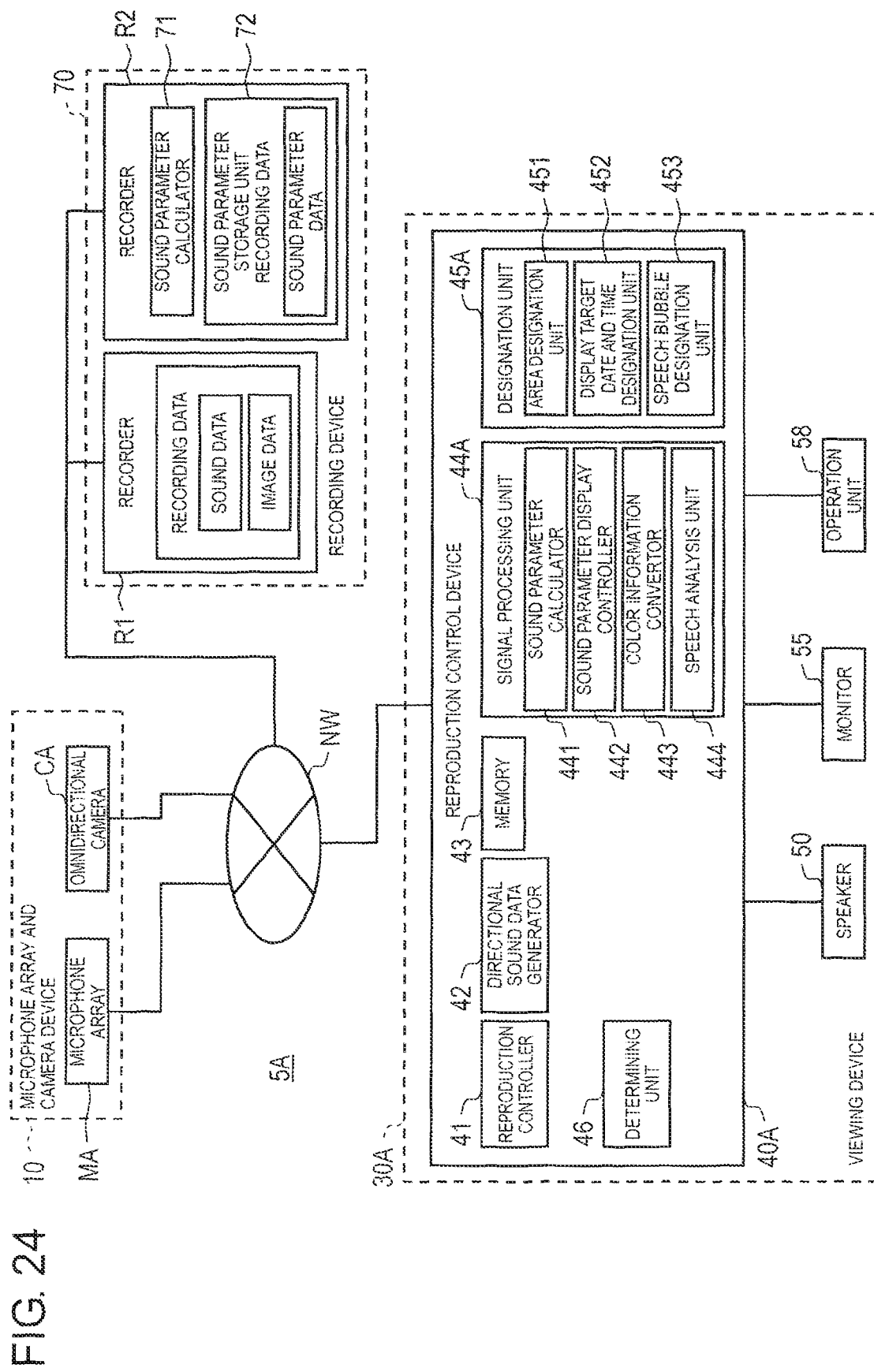
FIG. 24 is a block diagram illustrating in detail an example of a system configuration of a voice monitoring system according to a fourteenth exemplary embodiment.

A system configuration of voice monitoring system 5A of the fourteenth exemplary embodiment is partially different from voice monitoring system 5 according to each of the exemplary embodiments described above, so the system configuration will be described with reference to FIG. 24. FIG. 24 is a block diagram illustrating in detail an example of the system configuration of voice monitoring system 5A according to the fourteenth exemplary embodiment. In the description of FIG. 24, the same reference numeral is given to the same configuration as that in FIG. 1, description thereof will be simplified or omitted, and different contents will be described.

In FIG. 24, signal processing unit 44A of reproduction control device 40A of viewing device 30A includes speech analysis unit 444 in addition to sound parameter calculator 441, sound parameter display controller 442, and color information convertor 443. Designation unit 45A includes speech bubble designation unit 453 in addition to area designation unit 451 and display target date and time designation unit 452.

When a recording date and time (for example, May 1, 2016), a display time unit (for example, 1 hour), and time range RNG (see FIG. 25, for example, 10:00 to 11:00) are designated by the user operation, speech analysis unit 444 analyzes a speech tendency and speech contents of a person in monitoring area SA of time range RNG by using data of the sound parameter recorded in recorder R2. For example, as the speech tendency of the person, speech analysis unit 444 analyzes "whether a small number of people (for example, 1 person) speaks for a predetermined time or more" or "whether a large number of people (for example, two or more people) have conversations for a time less than the predetermined time" in monitoring area SA. For example, speech analysis unit 444 includes a unique threshold value for each of the number of people and the speech times, and according to a comparison result with these threshold values, speech analysis unit 444 analyzes "whether a small number of people (for example, 1 person) speaks for a predetermined time or more" or "whether a large number of people (for example, two or more people) have conversations for a time less than the predetermined time". Speech analysis unit 444 displays the analysis result of the speech tendency of the person in association with a speech period of the person, on GUI 100A of monitor 55 (see FIG. 25).

Figure 25:
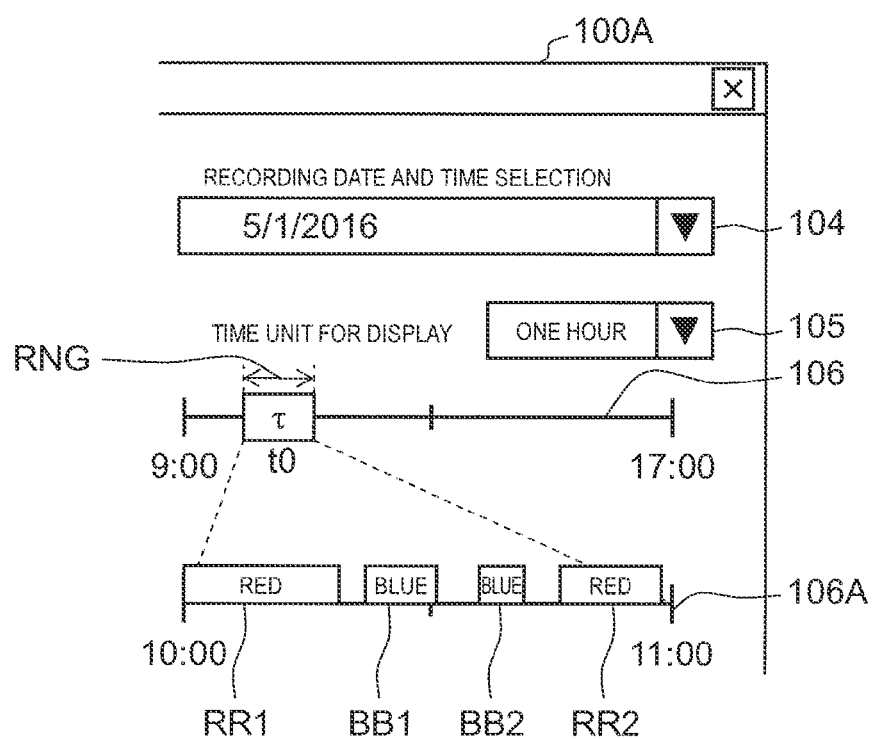
FIG. 25 is a diagram illustrating an example of a part of a GUI displayed on a monitor according to the fourteenth exemplary embodiment.

FIG. 25 is a diagram illustrating an example of a part of GUI 100A displayed on monitor 55 according to the fourteenth exemplary embodiment. In GUI 100A in FIG. 25, recording date and time selecting unit 104, display time unit setting unit 105, display target range setting unit 106, and seek bar 106A are enlargedly extracted and illustrated.

In GUI 100A illustrated in FIG. 25, seek bar 106A indicating details of time range RNG is displayed so that the details of time range RNG (for example, 10:00 to 11:00) designated by the user operation can be determined. Seek bar 106A is generated by speech analysis unit 444 and is displayed. Further, seek bar 106A may be displayed by sound parameter display controller 442.

The analysis result of speech analysis unit 444 is illustrated from a left end of seek bar 106A (that is, display start time of 10:00) to a right end (that is, display end time of 11:00). Specifically, a speech period analyzed as "a small number of people speaks for a predetermined time or more (long time)" is displayed with blocks RR1 and RR2 of red, for example and a speech period analyzed as "a large number of people have conversations for a time less than the predetermined time (short period)" is displayed with blocks BB1 and BB2 of blue, for example. In the fourteenth exemplary embodiment, a first time (that is, a time corresponding to the left end) of each of blocks RR1, BB1, BB2, and RR2 is referred to as "search time". The search time indicates a first time while a voice is detected when a small number or a large number of people speak, as an analysis result by speech analysis unit 444.

Here, a situation in which a small number of people speak for a predetermined time or more (that is, long time) may mean that a speaker (for example, a chairperson or a descriptor) consecutively speaks for a conference or the like or explains an agenda. In addition, a situation in which a large number of people have conversations for a time less than the predetermined time (that is, short period) may mean that a plurality of persons exchange opinions on the agenda for the conference or the like, for example.

If a cursor approaches each of the blocks by user operation, speech analysis unit 444 may generate summary information of speech contents corresponding to the corresponding block and display the summary information in a pop-up. Here, the summary information may be obtained from data of a voice such as a speaker or speech contents or may be displayed based on data obtained from another external unit. In a case where information of a person appearing in a captured image is saved in an external DB or the like in advance, by verifying a position (a position of a pixel in which the sound parameter is calculated) on the captured image at the time of detecting a speech and information on the person appearing in the captured image described above, the speaker can be determined by speech analysis unit 444.

Speech bubble designation unit 453 as a speech bubble controller displays speech contents of the person obtained by analysis of speech analysis unit 444 as a speech bubble, in association with the corresponding person on captured image GZ, on monitor 55. Speech bubble designation unit 453 determines a position on captured image GZ in which the sound source visual image is colorless based on a sound parameter corresponding to the speech contents of the person as a display position of the speech bubble. In addition, speech bubble designation unit 453 determines not to use a position on captured image GZ in which the sound source visual image is colored (for example, red or blue) based on the sound parameter corresponding to the speech contents of the person as the display position of the speech bubble. Accordingly, since when a sound source visual image is colored, a sound source exists around the sound source visual image and further, when the sound source visual image is colorless, the sound source does not exist around the sound source visual image, viewing device 30 can use a position on captured image GZ in which the sound source visual image is colorless as an appropriate display position of the speech bubble without decreasing visibility of the sound source visual image.

Figure 26:
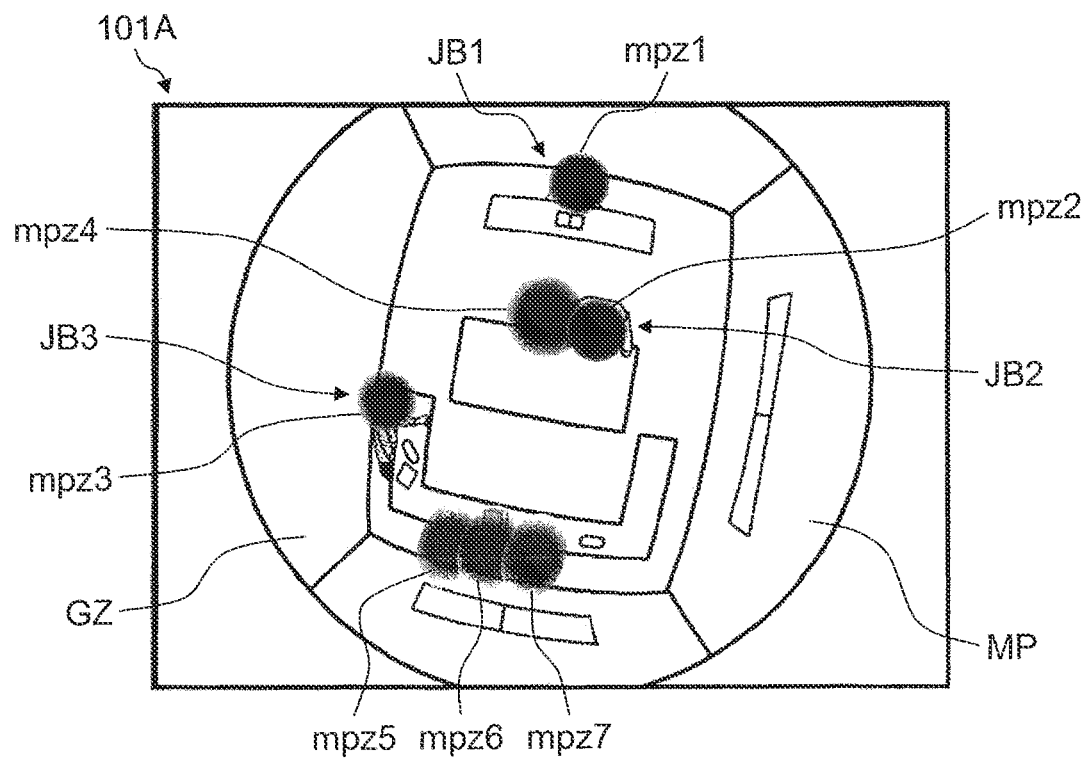
FIG. 26 is a diagram illustrating a display example in which a sound source visual image (voice heat map MP) is superimposed on a captured image at a display start time within a time range designated by a user operation.
Figure 27:
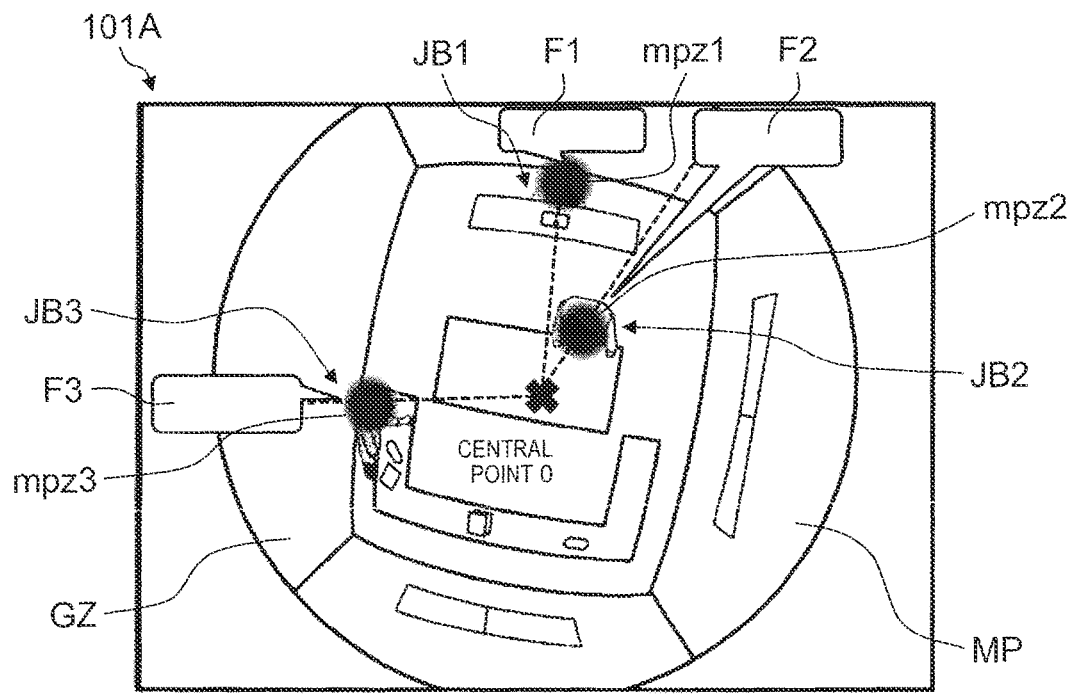
FIG. 27 is a diagram illustrating a display example in which a sound source visual image (voice heat map MP) and speech contents of a plurality of persons are superimposed on a captured image at a search time designated by a user operation.

Further, speech bubble designation unit 453 may determine a position along a line connecting central point O of captured image GZ and a position of the sound source on captured image GZ, and away from central point O as the display position of the speech bubble (See FIG. 27). FIG. 26 is a diagram illustrating a display example in which a sound source visual image (voice heat map MP) is superimposed on captured image GZ at a display start time within time range RNG designated by a user operation. FIG. 27 is a diagram illustrating a display example in which a sound source visual image (voice heat map MP) and speech contents of a plurality of persons are superimposed on captured image GZ at a search time designated by a user operation. In the description of FIG. 27, the same reference numeral is given to the same configuration as that in FIG. 26, description thereof will be simplified or omitted, and different contents will be described.

In FIG. 26, on display screen 101A of GUI 100A, a sound source visual image (for example, red) based on a sound parameter when person JB1 speaks is displayed as area mpz1, a sound source visual image (for example, red) and a sound source visual image (for example, blue) based on sound parameters when person JB2 speaks are respectively displayed as areas mpz2 and mpz4, further a sound source visual image (for example, blue) based on a sound parameter when person JB3 speaks is displayed as area mpz3. In addition, sound source visual images (for example, blue) based on other sound sources in which a person does not speak are respectively displayed as areas mpz5, mpz6, and mpz7.

In FIG. 27, speech bubbles F1, F2, and F3 are displayed at positions along lines LN1, LN2, and LN3 connecting central point O (that is, image center of captured image GZ) of captured image GZ and areas mpz1, mpz2, and mpz3 of the sound source visual images, and respectively away from central point O. For example, since captured image GZ is captured by omnidirectional camera CA using a fisheye lens and distortion easily occurs on an outside of captured image GZ and an unnecessary object such as a wall may appear, in general, visibility as image information has a characteristic that the visibility is not good on the outside of the image as compared with a center side of the image. By using the characteristic, speech bubble designation unit 453 determines at positions along lines LN1, LN2, and LN3 connecting central point O of captured image GZ and areas mpz1, mpz2, and mpz3 of the sound source visual images, and respectively away from central point O as the display positions of speech bubbles F1, F2, and F3 and respectively displays speech bubbles F1, F2, and F3 at the display positions.

In addition, for example, in a case where omnidirectional camera CA is installed so that a rear surface of a housing of omnidirectional camera CA is in contact with a ceiling surface and a lens center of the fisheye lens faces vertically downward direction, for a person appearing in captured image GZ, a head portion is located outside the center (that is, a side away from central point O of the captured image), and a foot portion is often located inside the center (that is, a side approaching central point O of the captured image). Also from this point of view, of speech bubble F1, F2, and F3 are displayed at the positions away from central point O, the speech bubble is displayed at a position close to the head portion, so that it is more appropriate as a display position of the speech bubble.

Figure 28:
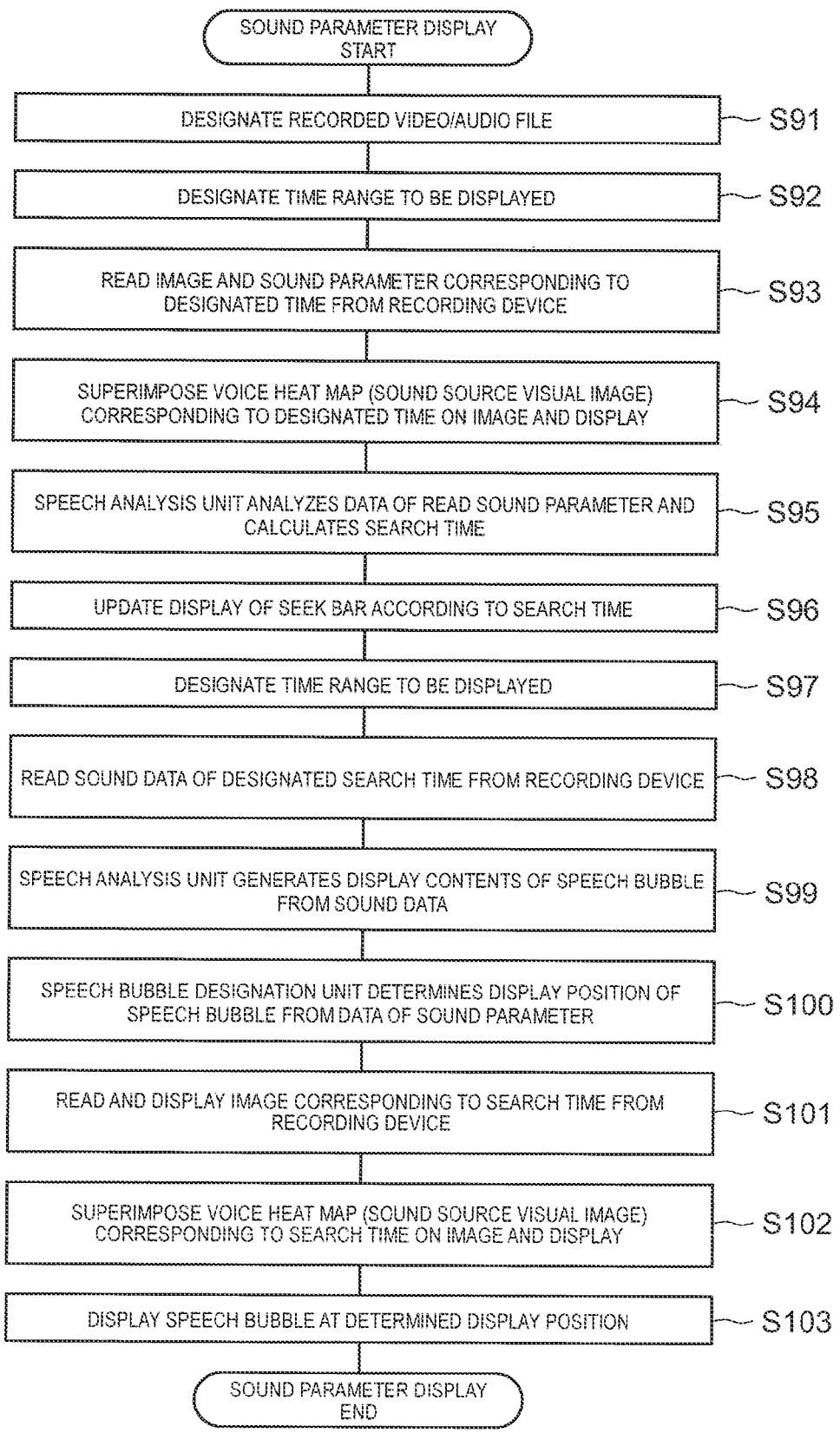
FIG. 28 is a flowchart for explaining in detail an example of an operation procedure of displaying a sound parameter according to the fourteenth exemplary embodiment.

FIG. 28 is a flowchart for explaining in detail an example of an operation procedure of displaying a sound parameter according to the fourteenth exemplary embodiment. The processes in steps S91, S92, and S93 are the same as the processes in steps S1l, S12, S13, and S14 in the first exemplary embodiment, so description thereof will be omitted.

According to the processes in steps S91 to S93, sound parameter display controller 442 generates a sound source visual image (voice heat map MP) converted into color information based on a sound parameter and superimposes the sound source visual image on captured image GZ of display screen 101 of on monitor 55 so as to display the resultant image on a captured image for example, at a first time of time range RNG (see FIG. 25) designated by the user operation (S94).

When a recording date and time, a display time unit, and time range RNG (see FIG. 25) are designated by the user operation (S92), speech analysis unit 444 analyzes speech tendency and speech contents of a person in monitoring area SA within time range RNG by using data of the sound parameter read from recorder R2 in step S93 (S95). Furthermore, based on an analysis result, speech analysis unit 444 calculates a search time, which is a speech time of the speech contents of each of persons, for each of the speech contents (S95). As described above, the search time indicates the start time (the left end) of each of blocks RR1, BB1, BB2, and RR2 in FIG. 25. Along with the calculation of the search time, speech analysis unit 444 colors and displays each of blocks RR1, BB1, BB2, and RR2 indicating each of speech periods on seek bar 106A of GUI 100A and updates the display of seek bar 106A (S96).

Here, any one of the search times (in other words, one block of respective blocks RR1, BB1, BB2, and RR2) is designated by the user operation (S97). Speech analysis unit 444 reads sound data at the designated search time from recorder R1 (S98) and generates text data of the speech contents displayed in the speech bubble by using the sound data (S99). For example, by executing a voice recognition process on the read sound data, speech analysis unit 444 extracts and generates text data of speech contents (for example, conversation contents) obtained from the sound data.

Based on data of a sound parameter in the designated search time (that is, the designated block), speech bubble designation unit 453 determines a display position of a speech bubble including the speech contents generated in step S99 (S100). Sound parameter display controller 442 reads a captured image (for example, a captured image captured at the search time) in the designated search time (that is, the designated block) from recorder R1 (S101).

Sound parameter display controller 442 generates a sound source visual image (voice heat map MP) converted into color information based on a sound parameter in the time range of the block including the search time and superimposes the sound source visual image on the captured image in the search time designated by the user operation to display the resultant image on a captured image of display screen 101 of monitor 55 (S102).

Furthermore, sound parameter display controller 442 displays the speech bubble including the text data generated in step S99 at the display position determined in step S100 (S103, see FIG. 27).

In this manner, in voice monitoring system 5A according to the fourteenth exemplary embodiment, based on the sound parameter stored in sound parameter storage unit 72 of recorder R2, speech analysis unit 444 analyzes the speech tendency and the speech contents of the person in monitoring area SA of time range RNG, according to time range RNG designated by the user operation. Sound parameter display controller 442 displays the analysis result of the speech tendency of the person in association with a speech period (that is, block in seek bar 106A in FIG. 25) of the person, on GUT 100A of monitor 55. Accordingly, if the time range is designated by the user operation, viewing device 30 can display the analysis result (for example, speech contents and speech tendency) on monitor 55 so as to be able for the user to intuitively and visually determine a voice detection period. In addition, viewing device 30 can display the speech contents of the analysis result as a speech bubble. Accordingly, the user can simply designate a voice which the user wants to reproduce while watching monitor 55 and can listen to a portion of the voice in an early stage (that is, stress-free) without waiting until the voice portion is reproduced and it is possible to reduce a confirmation time of the voice.

In addition, as the speech tendency of the person, speech analysis unit 444 analyzes "whether one person speaks for a predetermined time or more" or "whether a plurality of persons have conversations for a time less than the predetermined time" in monitoring area SA. Accordingly, viewing device 30 can more specifically and easily analyze the speech tendency of the person and can perform a speech analysis suited the user's taste and convenient for use in time range RNG designated by the user operation. In the same manner, speech analysis unit 444 can analyze that a plurality of persons speak for a predetermined time or more or one person speaks for a time less than the predetermined time.

In addition, sound parameter display controller 442 displays a speech of a person obtained by analysis of speech analysis unit 444 as a speech bubble, in association with the person on the captured image, on monitor 55. Accordingly, viewing device 30 can confirm speech contents before the user reproduces the voice, and can contribute to selection of the search time (block) of the voice which the user wants to see.

In addition, speech bubble designation unit 453 determines a position on the captured image in which the sound source visual image is colorless based on a sound parameter corresponding to the speech contents of the person as a display position of the speech bubble. Accordingly, since when a sound source visual image is colored, a sound source exists around the sound source visual image and further, when the sound source visual image is colorless, the sound source does not exist around the sound source visual image, viewing device 30 can use a position on captured image GZ in which the sound source visual image is colorless as an appropriate display position of the speech bubble without decreasing visibility of the sound source visual image.

Although the various embodiments are described with reference to the accompanying drawings, needless to say, the present disclosure is not limited to such an example. Those skilled in the art can conceive various modification examples or change examples within the scope described in the claims and these rightly belong to the technical scope of the present disclosure. Further, a voice monitoring system may be configured by appropriately combining each of the embodiments described above.

INDUSTRIAL APPLICABILITY

The present disclosure is useful as a voice monitoring system and a voice monitoring method capable of analyzing how much time and how much voice level a person performs a customer service for a customer or the like in an area to be monitored such as a store or the like for a designated past period, by visually viewing an analysis result, and improving monitoring analysis accuracy.

REFERENCE MARKS IN THE DRAWINGS 5, 5A VOICE MONITORING SYSTEM
10 MICROPHONE ARRAY AND CAMERA DEVICE
25 COMPRESSION PROCESSING UNIT
26 TRANSMITTING UNIT
30, 30A VIEWING DEVICE
40, 40A REPRODUCTION CONTROL DEVICE
41 REPRODUCTION CONTROLLER
42 DIRECTIONAL SOUND DATA GENERATOR
43 MEMORY
44, 44A SIGNAL PROCESSING UNIT
45, 45A DESIGNATION UNIT
46 DETERMINING UNIT
50 SPEAKER
55 MONITOR
58 OPERATION UNIT
61 CPU
62 COMMUNICATION UNIT
64 POWER MANAGEMENT UNIT
65 IMAGE SENSOR
66x MEMORY CARD
66y RAM
66z ROM
67 NETWORK CONNECTOR
70 RECORDING DEVICE
71 SOUND PARAMETER CALCULATOR
72 SOUND PARAMETER STORAGE UNIT
441 SOUND PARAMETER CALCULATOR
442 SOUND PARAMETER DISPLAY CONTROLLER
443 COLOR INFORMATION CONVERTOR
444 SPEECH ANALYSIS UNIT
451 AREA DESIGNATION UNIT
452 DISPLAY TARGET DATE AND TIME DESIGNATION UNIT
453 SPEECH BUBBLE DESIGNATION UNIT
CA OMNIDIRECTIONAL CAMERA
MA MICROPHONE ARRAY

What is claimed is:
1. A voice monitoring method in a voice monitoring system including a camera that images an area to be monitored, a microphone array that collects a sound in the area, a recorder that stores image data imaged by the camera and sound data collected by the microphone array in association with each other based on an imaging time of the image data, and a reproduction control device that displays image data imaged by the camera or image data recorded in the recorder on a monitor, the method comprising:
by the reproduction control device,
calculating a sound parameter for indicating magnitude of the sound at the imaging time in predetermined units of pixels constituting the image data, for each of the predetermined units, based on the sound data;
storing the calculated sound parameter in association with position information on the image data at the imaging time;
inputting, by an input unit, a predetermined time range including the imaging time of the image data displayed on the monitor as a display time, as a period to be processed of the sound parameter; and
calculating a cumulative value for the period to be processed of the sound parameter stored in the recorder for each of predetermined units of pixels constituting the image data and displaying a result of the cumulative value for the period to be processed of the sound parameter on the monitor.

2. The voice monitoring method of claim 1,
wherein the input unit inputs a predetermined area of the image data displayed on the monitor as a processing target area of the audio parameter, and
the result of the accumulated value is calculated for the processing target area of the voice parameter.

3. The voice monitoring method of claim 1,
wherein the sound parameter is calculated by using information indicating the presence or absence of a voice section included in the sound data collected by the microphone array.

4. The voice monitoring method of claim 1,
wherein the sound parameter is repeatedly calculated for each first interval and is calculated for each second interval which is equal to larger than N times the first interval, N being an integer that is greater than or equal to 2.

5. The voice monitoring method of claim 4,
wherein the sound parameter is calculated for each third interval which is equal to or greater than P times the first interval, P being an integer that is greater than N.

6. The voice monitoring method of claim 4,
wherein whether to use the sound parameter calculated for each first interval or whether to calculate a sound parameter based on the sound data recorded in the recorder for each interval shorter than the first interval and use the sound parameter is selected according to the designated time range.

7. The voice monitoring method of claim 1,
wherein an emphasis process is performed on a voice in an orientation direction from the microphone array toward a sound source corresponding to the target area of the cumulative value by using the sound data collected by the microphone array according to a designation operation of the target area of the cumulative value; and
the emphasized voice in the orientation direction is reproduced and output to a speaker.

8. The voice monitoring method of claim 7,
wherein a position, in which a cumulative value of the sound parameters is the largest, in a periphery including the designated visualized image of the cumulative value is calculated within the designated time range, and
the emphasis process is performed on the sound data collected by the microphone array in a direction from the microphone array toward the position, in which the calculated cumulative value is the largest, as the orientation direction.

9. The voice monitoring method of claim 7,
wherein the emphasized voice for a voice detection period, when a voice is detected in the sound data collected by the microphone array, for the designated period to be processed is reproduced.

10. The voice monitoring method of claim 7,
wherein in a case where a plurality of the voice detection periods are detected for the designated period to be processed, a list of the voice detection periods is displayed on the monitor and the emphasized voice for the voice detection period selected from the list is reproduced.

11. The voice monitoring method of claim 1,
wherein a speech tendency of a person in the area within the time range is analyzed based on the sound parameter, according to the designation of the period to be processed, and
an analysis result of the speech tendency of the person is displayed in association with a speech period of the person on the monitor.

12. The voice monitoring method of claim 11,
wherein whether one person speaks for a predetermined time or more or whether a plurality of persons speak for a time less than the predetermined time in the area is analyzed, as the speech tendency of the person.

13. The voice monitoring method of claim 11,
wherein analyzed speech contents of the person are displayed as a speech bubble in association with the person on the image data on the monitor.

14. A voice monitoring system, comprising:
a camera that images an area to be monitored;
a microphone array that collects a sound in the area;
a recorder that stores image data imaged by the camera and a sound collected by the microphone array in association with each other based on an imaging time of the image data; and
a reproduction control device that displays image data imaged by the camera or image data recorded in the recorder on a monitor,
wherein:
the recorder calculates a sound parameter for each of predetermined units of pixels constituting the image data, based on the sound data;
the recorder stores the sound parameter calculated in the recorder by the sound parameter calculator in association with position information on the image data at the imaging time;
the reproduction control device inputs a predetermined time range including the imaging time of the image data displayed on the monitor as a display time, as a period to be processed of the sound parameter; and
the reproduction control device calculates a cumulative value for the period to be processed of the sound parameter stored in the recorder for each of predetermined units of pixels constituting the image data and displays a result of the cumulative value for the period to be processed of the sound parameter on the monitor.

* * * * *